United States Patent
Jannink

(10) Patent No.: US 12,548,438 B2
(45) Date of Patent: Feb. 10, 2026

(54) INFRINGEMENT DETECTION METHOD, DEVICE AND SYSTEM

(71) Applicant: ACUSENSUS IP PTY LTD, Melbourne (AU)

(72) Inventor: Alexander Jannink, Victoria (AU)

(73) Assignee: ACUSENSUS IP PTY LTD, Melbourne (AU)

(*) Notice: Subject to any disclaimer, the term of this patent is extended or adjusted under 35 U.S.C. 154(b) by 53 days.

(21) Appl. No.: 18/633,672

(22) Filed: Apr. 12, 2024

(65) Prior Publication Data

US 2024/0265804 A1    Aug. 8, 2024

Related U.S. Application Data

(63) Continuation of application No. 18/109,677, filed on Feb. 14, 2023, now Pat. No. 11,990,035, which is a
(Continued)

(30) Foreign Application Priority Data

Jul. 19, 2018 (AU) .................................. 2018902619

(51) Int. Cl.
*G08G 1/017* (2006.01)
*G06V 10/60* (2022.01)
(Continued)

(52) U.S. Cl.
CPC ........... *G08G 1/0175* (2013.01); *G06V 10/60* (2022.01); *G06V 20/54* (2022.01); *G08G 1/054* (2013.01);
(Continued)

(58) Field of Classification Search
CPC ...... G08G 1/0175; G08G 1/054; G06V 10/60; G06V 20/54; G06V 20/625;
(Continued)

(56) References Cited

U.S. PATENT DOCUMENTS 6,266,627 B1   7/2001   Gatsonides
9,137,498 B1 *   9/2015   L'Heureux .......... G08G 1/0175
(Continued)

FOREIGN PATENT DOCUMENTS

EP        2517189 B1   3/2014
WO   1993019441 A1   9/1993
(Continued)

OTHER PUBLICATIONS

Screen capture from Facebook video clip entitled "Distracted drivers crackdown," 1 page, published on Jan. 16, 2018. Retrieved from Internet: <https://www.facebook.com/ACurrentAffair9/videos/distracted-drivers-crackdown/1412664425506597/>.
(Continued)

*Primary Examiner* — An T Nguyen
(74) *Attorney, Agent, or Firm* — Budzyn IP Law, LLC

(57) ABSTRACT

A method for detecting an infringement by vehicle operator is described. The method comprises detecting a vehicle; receiving one or more image of at least a part of the vehicle operator; automatically analysing with a neural network the one or more captured received image to detect an infringing act; and providing the one or more captured received images comprising the detected infringing act to thereby detect the infringement. Also described are a system, a device, a computer system and a computer program product all for detecting an infringement by a vehicle operator. The device may comprise one or more flash for illuminating the vehicle or a part thereof with light at a narrow band and one or more camera comprising a narrow band filter that lets through only the wavelengths of light produced by the one or more flash.

18 Claims, 15 Drawing Sheets

Related U.S. Application Data continuation of application No. 17/261,247, filed as application No. PCT/AU2019/000086 on Jul. 19, 2019, now Pat. No. 11,610,481.

(51) Int. Cl.
  *G06V 20/54* (2022.01)
  *G08G 1/054* (2006.01)
  *H04N 23/20* (2023.01)
  *G06V 20/62* (2022.01)

(52) U.S. Cl.
  CPC ........... *H04N 23/20* (2023.01); *G06V 20/625* (2022.01); *G06V 2201/08* (2022.01)

(58) Field of Classification Search
  CPC .... G06V 2201/08; H04N 23/20; G06N 3/045; G06N 3/00; H04L 63/0435
  See application file for complete search history.

(56) References Cited

U.S. PATENT DOCUMENTS

| | | | |
|---|---|---|---|
| 2002/0141618 | A1 | 10/2002 | Ciolli et al. |
| 2005/0073436 | A1 | 4/2005 | Negreiro |
| 2006/0047371 | A1 | 3/2006 | Janssen |
| 2008/0036623 | A1 | 2/2008 | Rosen |
| 2009/0015674 | A1 | 1/2009 | Alley et al. |
| 2009/0046897 | A1 | 2/2009 | Rowsell et al. |
| 2009/0207046 | A1 | 8/2009 | Arrighetti |
| 2010/0063634 | A1 | 3/2010 | Sung et al. |
| 2010/0271497 | A1 | 10/2010 | Monsive |
| 2011/0009107 | A1 | 1/2011 | Guba et al. |
| 2012/0002045 | A1 | 1/2012 | Tony et al. |
| 2012/0007983 | A1 | 1/2012 | Welch |
| 2012/0040650 | A1 | 2/2012 | Rosen |
| 2012/0162432 | A1 | 6/2012 | Abl et al. |
| 2013/0070957 | A1* | 3/2013 | Zhang ............... G06V 10/255 382/100 |
| 2013/0150004 | A1* | 6/2013 | Rosen ............... H04M 3/42357 455/418 |
| 2013/0271605 | A1 | 10/2013 | Winner |
| 2015/0054639 | A1 | 2/2015 | Rosen |
| 2015/0063634 | A1 | 3/2015 | Hofman |
| 2015/0286884 | A1 | 10/2015 | Xu et al. |
| 2017/0030716 | A1 | 2/2017 | Ali et al. |
| 2020/0020075 | A1 | 1/2020 | Khwaja et al. |
| 2021/0142055 | A1 | 5/2021 | Broggi |

FOREIGN PATENT DOCUMENTS

| | | |
|---|---|---|
| WO | 2015017883 A1 | 2/2015 |
| WO | 2017176711 A1 | 10/2017 |
| WO | 2019079845 A1 | 5/2019 |
| WO | 2020014731 A1 | 1/2020 |

OTHER PUBLICATIONS

Okeefe, Chris, Berejiklian government introduces new laws under road safety plan, published Feb. 6, 2018, 1 page. Retrieved from the Internet: <https://www.9news.com.au/national/nsw-cameras-to-catch-drivers-using-mobile-phones/40d42e35-34e6-4408-9393-f33dc4c51f6c>.

Campbell, Kate, Perth drivers caught using mobile phone, texting on freeway, published Mar. 11, 2018, 2 pages. Retrieved from the Internet: <https://www.perthnow.com.au/technology/smartphones/perth-drivers-caught-using-mobile-phone-texting-on-freeway-ng-b88752277z>.

Screen capture from YouTube video clip entitled "Cameras that catches drivers using mobile phones illegally," 1 page, published on Apr. 6, 2018. Retrieved from the Internet: <https://www.youtube.com/watch?v=wh9P4x9VIN0>.

Palin, Megan, Drivers using mobile phones could be fined without even knowing they've been caught, published Apr. 12, 2018, 3 pages. Retrieved from the Internet: <https://www.news.com.au/technology/innovation/motoring/hitech/drivers-using-mobile-phones-could-be-fined-without-even-knowing-theyve-been-caught/news-story/ecb141e8552b39560f7f395802e447d7>.

Blackburn, Richard, Using your mobile while driving: here's now you'll be caught, published May 3, 2018, 2 pages. Retrieved from the Internet: <https://www.news.com.au/technology/innovation/motoring/motoring-news/using-your-mobile-while-driving-heres-how-youll-be-caught/news-story/90178b07995711a2c3e61988242c5ee3>.

Screen captures from YouTube video clip entitled "Redflex-Halo Distributed," 1 page, published on May 7, 2018. Retrieved from the Internet: <https://www.youtube.com/watch?v=KI9QLr-9vGA&ab_channel=Redflex>.

Edwards, Grant, Cameras to catch drivers using mobile phones now law, published on Jun. 29, 2018, 2 pages. Retrieved from the Internet: <https://www.couriermail.com.au/news/queensland/sunshine-coast/cameras-to-catch-drivers-using-mobile-phones-now-law/news-story/df58c76226632cd9863049a18c583b27>.

Mourad, Sahar, Cameras catch hundreds of drivers on their phones eating, reading and even doing drugs at speeds of up to 100 km/h—as law passes to allow world-first technology to automatically fine offenders, published Jul. 9, 2018, 3 pages. Retrieved from the Internet: <https://www.dailymail.co.uk/news/article-5932237/High-tech-cameras-catch-Sydney-drivers-using-mobile-phones.html>.

Screen captures from Facebook page posted on Jul. 11, 2018, 2 pages. Retrieved from the Internet: <https://web.archive.org/web/20180711194005/http://www.onetask.com.au:80/>.

Screen captures from Acusensus website (https://www.acusensus.com) dated Jul. 12, 2018, 7 pages. Retrieved from the Internet: <https://web.archive.org/web/20180712141924/https://www/acusensus.com/>.

Screen captures from Facebook page including posts before Jul. 19, 2018, 1 page. Retrieved from the Internet: <https://www.facebook.com/OneTaskBA/>.

Xu, et al., "A machine learning approach for detecting cell phone usage," Proceedings vol. 9407, Video Surveillance and Transportation Imaging Applications 2015; 94070A (20155), published on Mar. 4, 2015, 8 pages.

Xu, et al., "A machine learning approach to vehicle occupancy detection," 17th International IEEE Conference on Intelligent Transportation Systems (ITSC): 1232-1237, published on Nov. 20, 2014.

Remarks included with Third-Party Prior Art Submission in connection with Australian Patent No. 2023100087, dated Dec. 13, 2023.

Remarks included with Third-Party Prior Art Submission in connection with Australian Patent No. 2023100087, dated Nov. 28, 2023.

International Search Report and Written Opinion from PCT International Application No. PCT/AU2019/000086, dated Sep. 23, 2019.

Yolo: Real-Time Object Detection, https://pjreddie.com/darknet/yolov2/.

Examination Report from Australian Patent Application No. 2023100087 dated Jan. 5, 2024.

T. Jaakkola, et al., "Exploiting Generative Models in Discriminative Classifiers," in: Advances in Neural Processing Systems (1999), pp. 487-493.

Perronnin, et al., *Towards Good Practice in Large-Scale Learning for Image Classification*, CVPR 2012—IEEE Computer Vision and Pattern Recognition, (Jun. 2012), pp. 3482-3489, 10.1109CVPR.2012.6248090.

Remarks submitted in connection with Australian Patent No. 2023100087 dated Mar. 27, 2024.

* cited by examiner

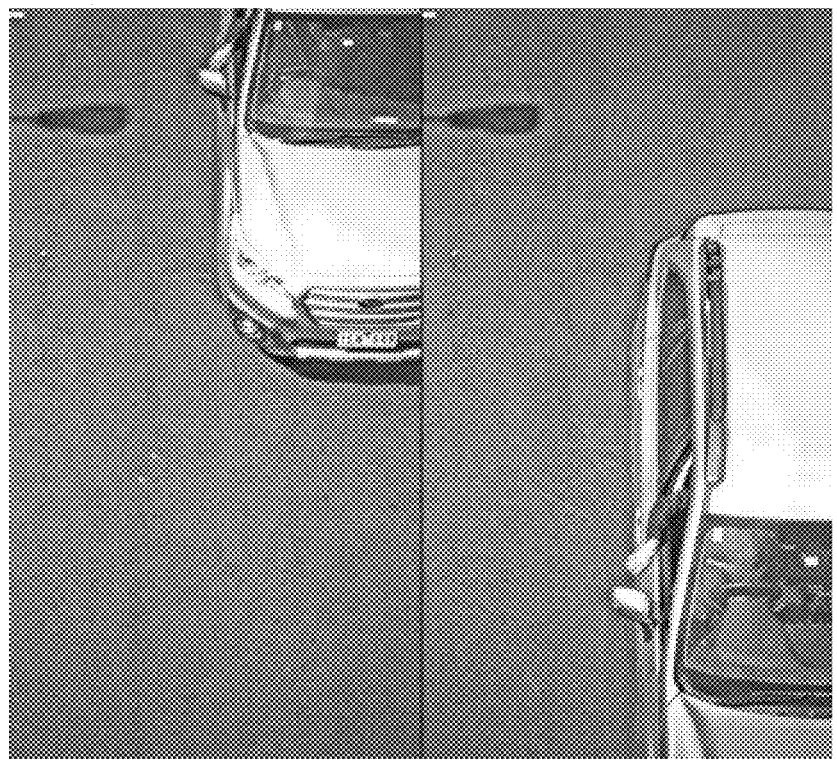
FIG. 3E
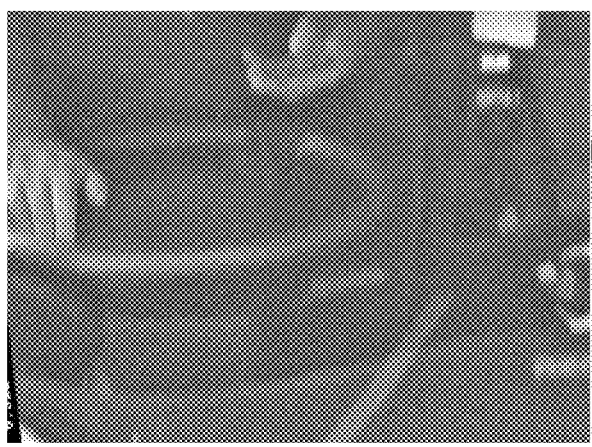 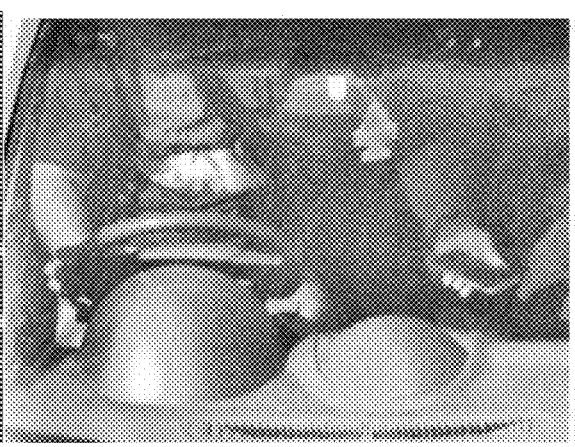
FIG. 3F                    FIG. 3G

INFRINGEMENT DETECTION METHOD, DEVICE AND SYSTEM

CROSS-REFERENCES TO RELATED APPLICATIONS

This Application is a continuation of U.S. patent application Ser. No. 18/109,677, filed Feb. 14, 2023, now allowed, which is a continuation of U.S. patent application Ser. No. 17/261,247, filed Jan. 19, 2021, now U.S. Pat. No. 11,610,481, which is a National Stage Application under 35 U.S.C. § 371 of PCT Application No. PCT/AU2019/000086, filed Jul. 19, 2019, which claims priority to Australian patent application Ser. No. 20/189,02619, filed Jul. 19, 2018, the entire contents of which are incorporated by reference herein.

FIELD OF THE INVENTION

The present invention relates to an infringement detection method, device and system. In one embodiment this invention relates to an infringement detection method device and system for detecting distracted operation of a vehicle.

BACKGROUND TO THE INVENTION

Traffic infringements such as, distracted driving and speeding, are a major source of death, injury and financial cost. While autonomous cars have the potential to solve or at least lessen this problem, these cars are not immediately available. Also, while device-based lockouts and in-vehicle technology may reduce instances of distracted driving and speeding, these are not across the board viable solutions because vehicle operators must opt-in. US patent Publication Nos. 20110009107 and 20130271605 describe examples of in-vehicle lock-out devices. Accordingly, enforcement is currently the only credible short term solution.

Video cameras and other cameras are known to be used to detect vehicles and record evidence. This approach is deficient in the areas of 24/7 operation and generation of high quality prosecutable evidence.

Australian Patent No. 20020141618 discloses a system for monitoring and reporting incidences of traffic violations at a traffic location. The system comprises a digital camera system deployed at a traffic location. The camera system is remotely coupled to a data processing system. The data processing system comprises an image processor for compiling vehicle and scene images produced by the digital camera system, a verification process for verifying the validity of the vehicle images, an image processing system for identifying driver information from the vehicle images, and a notification process for transmitting potential violation information to one or more law enforcement agencies.

Australian Patent No. 20120162432 describes a point to point speed system, the implementation of which uses an anonymised method of storing the images.

Australian Patent No. 20120007983 describes a two-image process, whereby a first image is used to obtain a license plate and a second image is used to gather evidence of the offence.

Australian Patent No. 20090046897 describes secondary image speed verification, using two photos to confirm speed via image means.

Australian Patent No. 20090207046 discloses a method for detecting vehicles by first detecting the license plate.

Australian Patent No. 20060047371 describes coupling an automated number plate recognition (ANPR) camera to a loop detector.

Australian Patent No. 20050073436 teaches alerting an officer on a license plate hit.

U.S. Pat. No. 6,266,627 describes detecting a vehicle's speed using radar, and capturing photos if vehicle is over a threshold.

Various technologies have been described which provide rudimentary mechanisms for detecting distracted driving.

US patent Publication No. 2008/0036623, the publication of U.S. patent application Ser. No. 11/678,489, describes a method and apparatus for automated detection of mobile telephone usage by drivers of vehicles. The apparatus includes a detection system comprising at least one mobile phone signal receiving device, at least one image capturing device, and at least one computer. The mobile phone signal receiving device is operative to detect a mobile phone signal transmitted from a vehicle. The at least one image capturing device is operative to capture at least one image of the vehicle. The at least one computer is operative to store in a storage device, information associated with at least one of the mobile phone signal transmitted from the vehicle; and the at least one image of the vehicle. The information stored in the storage device may be used to determine if a person associated with the vehicle should be prosecuted for illegal use of a mobile phone while driving the vehicle. This document also teaches using vantage points offset to the left or right of the driver to capture a respective hand gripping a mobile telephone, or a vantage point sufficiently close to straight in front. The use of an Artificial Intelligence system to detect use of a phone by an occupant, or other infringements, is also described.

US patent Publication No. 2010/00271497, the publication of US patent application Ser. No. 12/769,41, describes a traffic monitoring system and methods of use. This traffic monitoring system may be suitable for automatic monitoring of vehicle traffic at desired locations such as, for example, traffic lights, school zones, construction zones, remote locations, locations having high traffic accidents and/or locations with frequent traffic violations. The traffic monitoring system may be employed for detecting traffic violations involving a vehicle (e.g., running a red light, speeding and/or driving while using a mobile or cellular phone) and collecting information associated with the vehicle and/or the operator of the vehicle. The traffic monitoring system may include one or more portability features that may make this system well-suited for deployment and redeployment at any number of desired locations, for example where traffic monitoring is desirable but suitable permanent infrastructure is not in place or is cost prohibitive.

International Patent Publication No. WO2015/017883, the publication of International Patent Application No. PCT/AU2014/00783 describes a potential driving infringement flagging system comprising an image source that captures or receives an image of a driver of a vehicle or another person within the vehicle; a processor configured to analyse the image to determine whether the driver is using a mobile telephone while driving or whether the driver or the person is wearing a seatbelt; and an output that indicates the result of the analysis. The localisation of the driver is performed by setting a region in relation to the rest of the vehicle in which the driver is generally positioned. This localisation is varied with different types of vehicles. The mobile phone may be detected by searching for a visual footprint and/or image features associated with face. A sub-test may analyse the image to determine whether a hand is visible in the image within a distance from the perimeter of the face or if the driver is looking down.

The reference to any prior art in this specification is not, and should not be taken as, an acknowledgement or any form of suggestion that the prior art forms part of the common general knowledge.

SUMMARY OF THE INVENTION

Generally, embodiments of the present invention relate to an infringement detection method, device and system. In one embodiment this invention relates to an infringement detection method device and system for detecting distracted operation of a vehicle.

In a first form, although it need not be the only or indeed the broadest form, the invention resides in a method for detecting an infringement by vehicle operator, the method comprising: receiving one or more image of at least a part of the vehicle operator; automatically analysing the one or more received image to detect an infringing act; and providing the one or more received image comprising the detected infringing act to thereby detect the infringement.

The method of the first form may further comprise detecting a vehicle.

The method of the first form may further comprise capturing one or more image of at least part of the vehicle operator. The vehicle being operated may be that vehicle detected.

According to one embodiment of the first form, the method is a computer implemented method. According to this computer implemented embodiment, the automatic analysing may be with a processor.

In a second form, the invention resides in a system for detecting an infringement by vehicle operator comprising: a computer for receiving one or more image of at least a part of a vehicle operator; a computer processor for automatically analysing the one or more received image to detect an infringing act; and the computer or another computer providing the one or more received image comprising the detected infringing act to thereby detect the infringement.

According to one embodiment of the second form, the one or more image may be received through a computer network.

The system of the second form may further comprise detecting a vehicle.

The system of the second form may further comprise capturing one or more image of at least part of the vehicle operator. The vehicle being operated may be that vehicle detected.

The another computer of the second form may be operatively connected to the computer. The operative connection may be through a computer network.

In a third form, the invention resides in a computer program product comprising: a computer usable medium and computer readable program code embodied on said computer usable medium for detecting an infringement by a vehicle operator, the computer readable code comprising: computer readable program code devices (i) configured to cause the computer to receive one or more image of at least a part of the vehicle operator; computer readable program code devices (ii) configured to cause the computer to automatically analyse the one or more received image to detect an infringing act; and computer readable program code devices (iii) configured to cause the computer to provide the one or more received image comprising the detected infringing act to thereby detect the infringement.

The computer program product of the third form may further comprise computer readable program code devices (iv) configured to cause the computer to detect said vehicle.

The computer program product of the third form may further comprise computer readable program code devices (v) configured to cause the computer to capture one or more image of at least part of the vehicle operator. The vehicle being operated may be that vehicle detected.

In a fourth form, the invention resides in a device for detecting an infringement by a vehicle operator, the device comprising: one or more sensor for detecting a vehicle; one or more camera for capturing one or more image of at least a part of the vehicle operator; one or more computer processor for automatically analysing the one or more captured image to detect an infringing act; and one or more output for providing the one or more captured image comprising the detected infringing act to thereby detect the infringement.

The device of the fourth form may further comprise one or more flash to illuminate the detected vehicle or part thereof with light at a narrow band.

The one or more camera according to the fifth embodiment may comprise a narrow band filter that lets through only the wavelengths of light produced by the one or more flash.

In a fifth form, the invention resides in a method for detecting an infringement by a vehicle operator, the method comprising: detecting a vehicle with one or more sensor; capturing one or more image of at least a part of said vehicle operator with one or more camera; automatically analysing the one or more captured image to detect an infringing act; and providing the one or more captured image comprising the detected infringing act to thereby detect the infringement.

The method of the fifth form may further comprise illuminating the detected vehicle or part thereof with one or more flash with light at a narrow band.

The capture according to fifth form may be capture wherein at least one of the one or more camera comprises a narrow band filter that lets through only the wavelengths of light produced by the one or more flash.

In a sixth form, the invention resides in a computer system for detecting an infringement by a vehicle operator, the computer system comprising: one or more sensor for detecting a vehicle; one or more camera for capturing one or more image of at least a part of the vehicle operator; a computer processor for automatically analysing the one or more captured image to detect an infringing act; and an output for providing the one or more captured image comprising the detected infringing act to thereby detect the infringement.

According to the sixth form the system may further comprise one or more flash for illuminating the detected vehicle or part thereof with light at a narrow band.

The capture according to the sixth form may be capture wherein at least one of the one or more camera comprises a narrow band filter that lets through only the wavelengths of light produced by the one or more flash In a seventh form, the invention resides in a computer program product comprising: a computer usable medium and computer readable program code embodied on said computer usable medium for detecting an infringement by a vehicle operator, the computer readable code comprising: computer readable program code devices (a) configured to cause the computer to detect a vehicle based on input from one or more sensor; computer readable program code devices (b) configured to cause the computer to capture with one or more camera one or more image of at least a part of the vehicle operator of the detected vehicle; computer readable program code devices (c) configured to cause the computer to automatically analyse the one or more captured image to detect an infringing act; and computer readable program code devices (d) configured to cause the computer to provide the one or more captured image comprising the detected infringing act to thereby detect the infringement.

The computer program product of the seventh form may further comprise computer readable program code devices (e) configured to cause the computer to illuminate the detected vehicle or part thereof with one or more flash with light at a narrow band.

The capture according to the seventh form may be capture wherein at least one of the one or more camera comprises a narrow band filter that lets through only the wavelengths of light produced by the one or more flash.

The one or more camera of any one of the above forms may comprise a 5 to 50MP; 10 to 45MP; or 20 to 35MP camera. The one or more camera may comprise a sensor selected to maximise light sensitivity and/or minimise noise. The camera sensor may enable high quality low-light images to be obtained. The sensor may comprise excellent dynamic range. The dynamic range may comprise at least 66 dB or greater than 70 dB. The one or more camera may comprise a rolling-shutter or a global shutter. In one embodiment the one or more camera comprises a global shutter. The one or more camera may comprise a monochrome camera. The one or more camera may comprise a minimum exposure time of at the slowest 0.5 ms (½oooth); 0.1 ms (⅒oooth); or 0.2 ms (⅕oooth). The exposure time may comprise a range of 0.05 ms to 0.5 ms; or 0.1 to 0.3 ms.

The one or more camera of any one of the above forms may comprise one or more filter. The one or more camera may or may not comprise an infra-red (IR)-blocking filter. The one or more camera may comprise a narrow band filter applied to a front or rear of the one or more lens. The narrow band filter may let through only the wavelengths of light produced by the respective flash of the one or more flash. This narrow band filter may eliminate the majority of ambient light and/or light produced by the sun. When the one or more flash comprises an 850 nm flash, the one or more filter may let through light only between 700 and 1000 nm; 750 and 950 nm; 800 and 900 nm; 820 and 890 nm; 830 and 880 nm; 850 and 870 nm; or 840 and 860 nm. The one or more filter may eliminate about 90%; about 95% or about 97.5% of the light normally visible by the camera, letting through only the light at the same wavelength as the respective one or more flash.

The narrow band filter may block all light or substantially all light except that light at or around a particular wavelength.

The narrow band filter may comprise a wavelength band of less than 5 nm; 5; 10; 15; 20; 25; 30; 35; 40; 45; 50; 55; 60; 65; 70; 75; 80 85; 90; 95; 100; 110; 120; 130; 140; 150; 200; 250; 300; 350; 400; 450; or 500 nm. The narrow band filter may comprise a wavelength band of 5 nm or less; 10 nm or less; 15 nm or less; 20 nm or less; 25 nm or less; 30 nm or less; 35 nm or less; 40 nm or less; 45 nm or less; 50 or less; 55 nm or less; 60 nm or less; 65 nm or less; 70 nm or less; 75 nm or less; 80 nm or less; 85 nm or less; 90 nm or less; 95 nm or less; or 100 nm or less.

In one particular embodiment, the narrow band filter may comprise a Bi850 Near-IR Interference Bandpass Filter.

In another particular embodiment, narrow band filter may comprise a useful range of 845 to 860 nm, that is a range of 15 nm.

The one or more camera of any one of the above forms may comprise one or more lens such as, a varifocal lens. The one or more camera may comprise a C mount lens or a larger format camera. The one or more camera may comprise a fixed lens such as, an industrial fixed focal length lens. The industrial fixed focal length lens may comprise a rating of 12MP. In one embodiment the one or more camera lens rating matches or exceeds the sensor to avoid image blur.

The one or more lens according to any one of the above forms may comprise a focal length of 10 to 100 mm; 20 to 80 mm or 30 to 60 mm. For mobile installation the focal length may comprise 20 to 50 mm; 25 to 45 mm; or 30 to 40 mm. For mobile installation the focal length may comprise 35 mm. For fixed installation the focal length may comprise 35 to 65 mm; 30 to 60 mm or 45 to 55 mm. For fixed installation the focal length may comprise 50 mm. The focal length may be selected to provide tight zoom onto the vehicle for higher resolution and enough width and context to show one or more of: an entire width of the vehicle; most of a lane; and vehicle number plate.

According to any one of the above forms, the one or more camera may or may not comprise a polarizer.

In one embodiment of any one of the above forms, the one or more camera may comprise one or more flash for illuminating the detected vehicle or a part thereof. The one or more flash may comprise one or more of a 760 nm and an 850 nm flash. The one or more flash may be capable of firing 10,000 to 100,000; 20,000 to 80,000 or 30,000 to 50,000 times per day at high intensity and short duration. In one embodiment, the one or more flash is capable of firing 40,000 times per day at high intensity and short duration. The one or more flash may comprise one or more light source, the one or more light source may comprise one or more LED light source and/or one or more laser light source. The one or more light source may comprise a narrow-spectrum. The one or more light source may comprise 10 to 1,000; 40 to 500; 300 to 400 light sources. Each of the one or more light sources may comprise an IR LED light source. The one or more light source may be tightly aimed using individual lenses. The individual lenses may be at 1 to 35; 15 to 30; or 20 to 25 degrees. In one embodiment the individual lenses are at 22 degrees. The one or more flash may comprise one or more capacitor bank to store charge between flashes. The one or more light source when triggered may generate a high intensity of light for a very short duration.

In one particular embodiment of any one of the above forms, the one or more camera comprises a 12MP C Mount camera with a Sony Pregius global shutter sensor.

According to any one of the above forms, the light source may comprise a tightly controlled wavelength. The tight control may comprise a narrow spectral band. The one or more camera filter may exclude all light not within the controlled spectral band. In one embodiment the tightly controlled wavelength comprises a narrow spectrum light source. The narrow spectrum light source may transmit with a full width at half maximum (FWHM) spectral bandwidth of 5; 10; 20; 25; 30; 35; 40; 45; or 50 nm.

In a particular embodiment of any one of the above forms, the one or more light source may comprise an Oslon Black, Oslon Black Series 850 nm −80°, SFH 4715AS available from Osram Opto Semiconductors.

According to any one of the above forms, the spectral bandwidth may be determined at 50% Irel,max full width at half maximum (FWHM).

The one or more flash may comprise a main flash and a separate offset flash for license plates.

One or more camera setting may be changed between capture of respective images comprised in the one or more image. The setting may be changed rapidly and/or automatically. The one or more camera setting may comprise exposure time and/or flash intensity.

According to any one of the above forms, an auxiliary camera may be comprised. The auxiliary camera may capture one or more image of a vehicle license plate.

In one embodiment of any of the above forms, a high angle into the vehicle for the camera may be used in order to see the infringement. The angle may comprise 30 to 90; 35 to 90; or 40 to 90 degrees vertical from a ground plane to camera. In one embodiment the angle may comprise 65 degrees. The angle may comprise 30; 31; 32; 33; 34; 35; 36; 37; 38; 39; 40; 41; 42; 43; 44; 45; 46; 47; 48; 49; 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89 or 90 degrees. In another embodiment, a minimum 40 degrees vertical from a ground plane to camera is used. When the vehicle is a truck lower angles may be required than for a passenger car.

According to any one of the above forms, a camera mount position of between 2 and 15; 3 and 12; or 4 and 10 m above the road surface is comprised. In one embodiment the mount position is a minimum of 4 m and/or 7 to 10 m above the road surface.

In another embodiment of any one of the above forms, a camera mount position comprising a horizontal angle of between −70 and 70; −45 and 45 and −30 to 30 degrees may be comprised. In one embodiment of a roadside use, the horizontal angle may comprise up to 45 degrees. In one embodiment of an over-the-lane use, the horizontal angle may comprise 0 degrees. The over-the-lane use case may comprise a fixed installation of a high camera.

In yet another embodiment of any one of the above forms, the one or more camera may be positioned to a passenger side of the vehicle.

The one or more camera may comprise two or more cameras to provide additional angles into the vehicle. The two or more cameras may provide depth information via stereoscopic means to enhance detection accuracy.

In still another embodiment of any one of the above forms, a video camera is further comprised. The video camera may provide one or more of additional context; wider field of view; sustained evidence of distraction over several seconds; and license plate information.

According to any one of the above forms a processor may be comprised within a computer. The computer may be connected to the device at the installation site or via a network connection. The network connection may comprise an Ethernet connection. The computer may be up to 100 m away. The computer may be mounted within 5 m. The computer may comprise one or more graphics card to improve processing speed. The computer may comprise a Linux operating system.

The automatic image analysis may comprise classification of an image as showing a driver using a phone or mobile device and/or detect a phone or mobile device in an image and reports the phone or mobile device location.

The one or more image may comprise one or more standardised image. The one or more standardised image may comprise one or more cropped image comprising standard width and height centred or substantially centred on a driver coordinate. The width and height may be chosen to capture complete detail of the driver and exclude any passengers. The one or more cropped image may be padded with grey so that the driver coordinate remains in the centre and the one or more cropped image is standard size. The one or more cropped image may be analysed to determine the brightest and darkest pixels. An offset may be applied to all pixels in the one or more cropped image so that the darkest pixels becomes set to a value of zero (0). A scale may be applied to all pixels in the one or more cropped image so that the brightest pixels become set to a value or 255. All other pixels may be linearly scaled between 0 and 255 in a histogram equalisation operation. The analysis of the one or more cropped image may maximise contrast in the region of interest. The one or more cropped image may be resized so that the resulting file comprises a standard file size.

The one or more cropped image may be adjusted to comprise a standardised brightness and/or standardised contrast. The image adjustment may be automatic such as by computer processing.

The automatic analysis may comprise a detection. The detection of a phone or mobile device may comprise searching the one or more image for a phone or mobile device. The search may comprise a neural network or artificial neural network such as a deep neutral network or a deep convolutional neural network. The search may be of an entire image. If a phone or mobile device is detected, based on its confidence score the one or more image may be sent for further review. The further review may be by a person. One or more image may be excluded if a detected phone or mobile device is associated with a passenger and not a vehicle operator or driver. One or more image may be automatically excluded if the phone or mobile device is detected in a holder and not grasped by hand.

The captured and/or received image may comprise a view of the complete front of the vehicle and the lane the vehicle is in.

The neural network may comprise an object detection system. The object detection system may use a neural network based YOLO (you only look once) real time object detection architecture.

The neural network may comprise an image classifier. The image classifier may comprise a neural network based VGG (Visual Geometry Group) classifier. The classifier may receive the one or more cropped image. The classifier may be pre-trained. The pre-training may comprise training on a data set such as, the 1,000 class ImageNet set. The output model of the network may be modified to identify only two classes: received cropped images containing illegal phone or mobile device use, i.e. positive, and received cropped images not containing illegal phone or mobile device use, i.e. negative. The classifier may have been trained by fine tuning on a training set of example images. The example images may comprise, more than one hundred, more than one thousand, more than a hundred thousand, or more than one million example images such as, cropped images. The training set may comprise positive and negative labelled images. When the received cropped image of the driver is fed into the classifier network, the analysis may determine as output a confidence that the image is positive for phone or mobile device use. The determined confidence may comprise for example a confidence output of 0% is very unlikely to show phone or mobile device use and a confidence output of 100% is very likely to show phone or mobile device use. A threshold may be used to limit which images are deemed positive and which are deemed negative. The threshold may comprise a threshold value which may be dynamically adjusted so that a top margin of images are deemed positive and sent on for manual review. The top margin may comprise a top 5; 10; 15; 20; or 25% of received cropped images with respected to determined confidence.

According to any one of the above forms, the analysis may comprise a real time object detector. The real time object detector may identify the driver by the presence of a steering wheel and the human behind that wheel. The training set may comprise images from various angles optionally, both vertical and horizontal angle variations. The training set may comprise images of many different vehicle types, and optionally images of both left hand drive vehicles and right hand drive vehicles. The analysis may comprise a positive identification of the driver and ignore passengers. The real time object detector may output a location of the driver in the image and optionally a confidence score that the driver has been found.

According to any one of the above forms, when the driver has been located in the received image, the received image may be cropped.

The standardised one or more cropped image may be supplied to the image classifier. The image classifier may receive the standardised one or more cropped image. The image classifier may have been trained on a training set comprising a plurality of driver cropped image examples. The training set contains labelled images of drivers illegally touching phones or mobile device, non-illegally touching phones or mobile device, and not touching phones or mobile devices at all. When the image of the driver is received by the image classifier, an output comprising a most likely category and a confidence score of making that determination may be provided.

The classification may comprise determining the location of a driver in the one or more image. The determination of the location may comprise steering wheel detection and/or person detection. After determination the one or more image may be cropped to generate an image showing only the driver and the driver's immediate surrounds. The immediate surround may comprise a driver's wingspan. The cropped image may then be provided for further review. The further review may be by a person.

According to any one of the above forms, the detection may comprise a confidence factor or threshold. In one embodiment, only the one or more captured images above a threshold are provided. The confidence threshold may be adjusted. The threshold may comprise a setting of 0% of offences missed, 100% of images processed manually to 100% of offences missed, 0% of images processed manually. In one embodiment, the threshold comprises 5% missed for 10% manual processing.

The further review may be conducted by a person and may comprise a multi-stage process. The further review may be conducted when a high confidence level is determined. The multi-stage process may comprise one or more of: generation of a cropped image of a driver from the one or more image; uploading the cropped image to a server; a log in to an "image review' website; presentation of the cropped image; selection of one of four options: 1) On phone or mobile device; 2) Not on phone or mobile device; 3) Uncertain; and 4) Other; if 1); 3) or 4) are selected, a message may be sent to the camera system; and the next cropped image may then be presented for review or further review.

The server may comprise a cloud server. The server may comprise an AWS SQS (Amazon Web Services Simple Queue Service). The log in may comprise entering login credentials. The message may be sent by the server.

According to any one of the above forms, the providing may be for further review or confirmation. The further review may be by a human. The providing may be through a computer or telecommunications network. The further review or confirmation may comprise evaluating whether the image shows a driver clearly using a phone or mobile device; a driver clearly not using a phone or mobile device; or an uncertain classification. The classification may provide a confidence score of each categorization. When on-phone or on-mobile device use confidence exceeds a threshold and/or non-on-phone or mobile device use is lower than a threshold, the image may be sent for further review.

In one embodiment of any one of the above forms, the providing may be to a nearby intercept vehicle. The intercept vehicle may comprise a police vehicle. The intercept vehicle may receive the provided one or more captured imaged after further review. The one or more image may be provided to the nearby intercept vehicle when a high likelihood of phone or mobile device use or infringement is determined. The further review may be remote or by dedicated person deployed on site. The intercept vehicle may be provided with the one or more image on a personal computing device such as, a mobile phone or a mobile device.

The providing may comprise a transfer of the incident file or one or more image to a server. The incident file or one or more image may be transferred to a designated folder within the server.

The incident file or one or more image may be downloaded from the server for the further review. The further review may comprise un-encryption and/or extraction of the incident file. The incident file may be processed as would a red light; speed or other traffic infringement.

According to any one of the above forms, a registration lookup and infringement notice may be sent to a registered owner of the vehicle.

In another embodiment of any one of the above forms, one or more of the sensor, camera and/or processor are mounted to a fixed installation; mounted to a tripod; mounted to a vehicle; or mounted to a trailer. The fixed installation may comprise a gantry; a bridge; or other structure. The tripod may be temporarily deployed at a desired location. The trailer may comprise a work-light trailer. The fixed installation and trailer mount may comprise a high up mounting. In another embodiment, the processor is in a remote location.

In yet another embodiment of any one of the above forms, with the method comprises providing a power supply and/or the device comprises a power supply. The power supply may comprise one or more battery.

According to any one of the above forms, the one or more infringement comprises distracted driving or distracted operation of the vehicle and/or mobile phone or mobile device use. The infringement may comprise use of a mobile devices such as a tablet computer; a laptop computer; a smart watch; a gaming device; or any device with a display screen. The infringement may also comprise failure to wear a seatbelt and/or incorrect seating or restraint of the driver or one or more passenger.

According to any one of the above forms, the detection and/or sensor may comprise a radar. The radar may comprise a speed enforcement grade 3D or 4D tracking radar. The radar may be used to trigger the camera to capture the one or more image.

According to any one of the above forms, the vehicle may be a motor vehicle such as, an automobile, a car, a van, a truck, a moped, a motorbike or a bus.

According to any one of the above forms, the one or more captured image may be provided to a Road Authority or to Police.

In one embodiment of any one of the above forms, the capture of the one or more image is triggered by the detection and/or the one or more sensor. The triggered capture allows one or both of: capture at a precise position; and sufficient illumination. The capture may be when the vehicle reaches an image capture point.

The one or more image may be provided with additional data. The additional data may comprise one or more of vehicle speed; average speed; site location; and timestamps. The one or more image and/or the additional data may be comprised in an incident file. The incident file may be encrypted using one or more encryption method. The incident file may comprise a SQLite database file. The encryption may comprise a randomly generated AES symmetric key. The AES key may then be encrypted using an RSA public key and be packaged with the infringement file. The file may only be un-encrypted with the RSA private key in order to access the AES key. The one or more image and additional data may be hashed and encrypted using a private key. The hash may be checked using the public key.

The one or more image may comprise at least one image comprising a license plate; and at least one image comprising the infringing act. The one or more image may comprise images at more than one view angle.

The one or more image comprising the license plate may be captured at a reduced exposure setting. The reduced exposure setting may comprise a lower gain and/or exposure time. The at least one image comprising the infringing act may be captured at an increased exposure setting. The increased exposure setting may comprise a higher gain and/or exposure time. The plate image may be exposed at a level of 1% to 50% relative magnitude of the infringing act setting. In one embodiment the plate image is exposed at a level of 5%.

In another embodiment of any one of the above forms, a real-time display of offences on a variable message sign may show images of the infringements.

In still another embodiment, a survey service may be provided showing prevalence of infringement by time of day, vehicle type, location or another parameter or variable.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIGS. 3A to 3H show example images captured with a tripod deployment during the day with no flash according to one embodiment of the invention.

Figure 1:
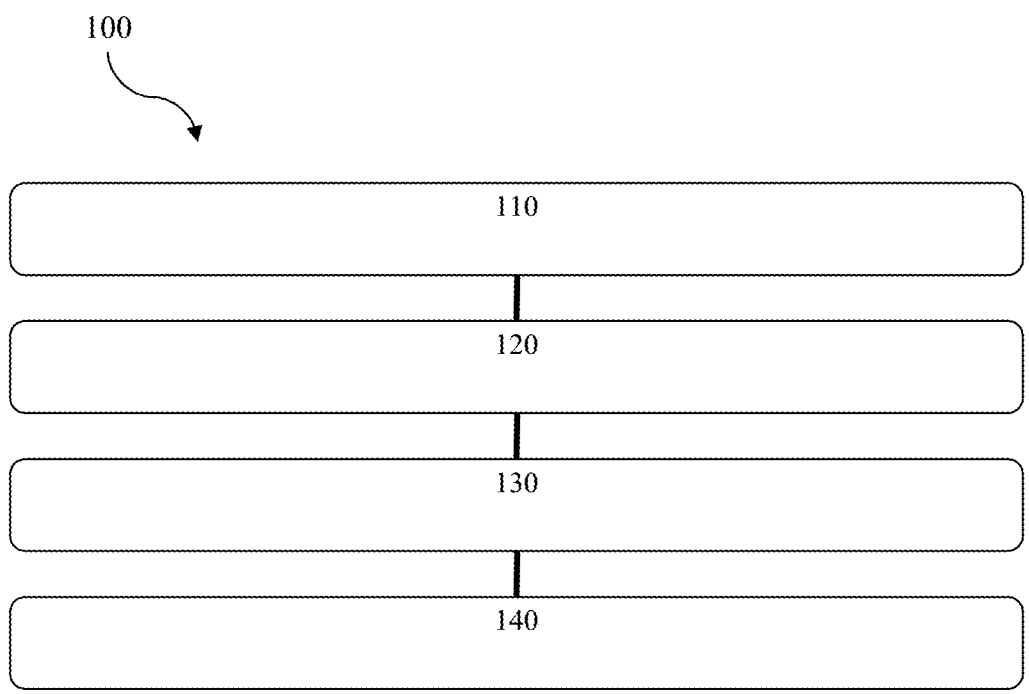
FIG. 1 is a flowchart showing a method according to one embodiment of the invention.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION OF THE INVENTION

Embodiments of the present invention relate to an infringement detection method, device and system.

The invention is at least partly predicated on the inventor's unexpected discovery that, in one embodiment, by avoiding glare and having enough light and resolution to penetrate through the windshield to see the offending behaviour an infringement could be detected. Further regarding, in image recognition the inventor has discovered that efficiency can be obtained by reducing the search space and by having humans review the least number of images.

Surprisingly, the inventor has found that, in one embodiment of the invention, removing glare from windshields by using a tight spectrum flash and tight spectrum filtering on the camera, may advantageously remove light from other sources such as the sun, and may only provide the artificial illumination for image capture.

Although it will be described with reference to mobile phone use as an infringement, the invention is not so limited. For example, use of other mobile devices such as, tablet and laptop computers; smart watches; and gaming devices may be a detected infringement.

In one embodiment, the present invention captures prosecutable evidence of people using their phone or mobile device while operating a motor vehicle. The system may operate semi-autonomously to capture photographic evidence and may automatically detect the use of the phone or mobile device.

As show in FIG. 1, in one embodiment, the method 100 of the invention comprises four major steps: detect 110 a vehicle; capture 120 one or more image; analyse 130 for computing device use; and provide 140 the one or more image to detect the infringement.

The invention may be used with four different installation platforms. The first is with equipment mounted to a fixed installation such as a gantry, bridge or other structure. This is similar to how a point-to-point (average) speed system is installed. The second is with equipment tripod mounted and deployed temporarily with battery power supply. The third is with equipment mounted to a vehicle for mobile operations. This is very similar to a mobile speed camera. The fourth is with equipment mounted to a trailer, similar to a work-light trailer, with cameras mounted very high up so as to replicate a fixed installation height.

The one or more captured image may be dealt with using one or two data use cases. In a first, evidence is captured and then transmitted to a back office system. This is the same way that speed and red-light cameras operate. The second is for the one or more image to be transmitted to a nearby police intercept vehicle. The evidence may or may not have been reviewed by a human operator first.

In order to capture vehicles travelling at any speed, and to capture the vehicles at very precise positions along the road, and to illuminate each image sufficiently, a triggered image capture system may be used rather than a video system. A radar may be used to detect a vehicle, and then when the vehicle reaches the appropriate image capture point, one or more camera captures one or more image. The one or more image may be packaged together along with other data such as vehicle speed, site location and accurate timestamps into an incident file. The incident file may then be encrypted using a combination of encryption methods.

An incident file is a package of images and metadata such as, one or more of detection data; location; vehicle details; phone use detection scores; etc, which is digitally signed. Typically, the incident file will be encrypted.

In one embodiment the radar comprises a speed enforcement grade 3D or 4D tracking radar. The radar accurately tracks the position and speed of all vehicles, informing the one or more camera when to capture images.

Figure 6A:
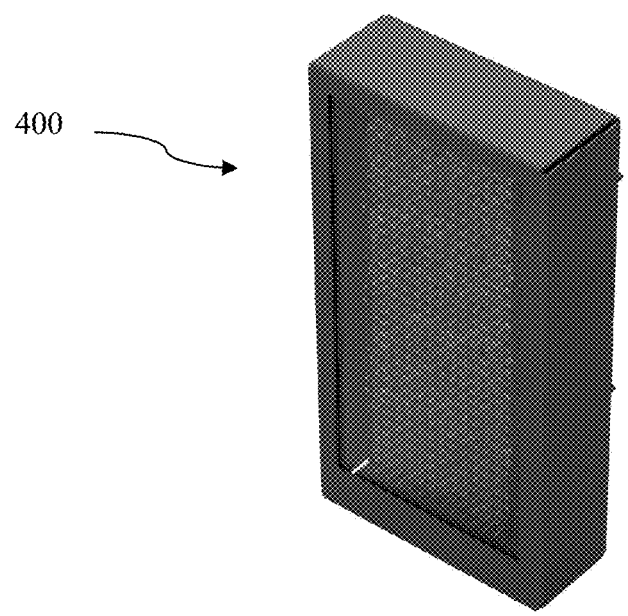
FIG. 6A shows a suitable flash according to one embodiment of the invention.

FIG. 6A shows one embodiment of a flash 400 suitable for use within a vehicle mounted device 300 according to one embodiment of the invention.

Figure 6B:
FIG. 6B shows a vehicle mounted device according to one embodiment of the invention and incorporating the flash of FIG. 6A.

FIG. 6B shows one embodiment of a camera 600 comprised in device 300 according to one embodiment of the invention. Camera 600 comprises a 12MP C Mount camera with a Sony Pregius global shutter sensor used.

Figure 6C:
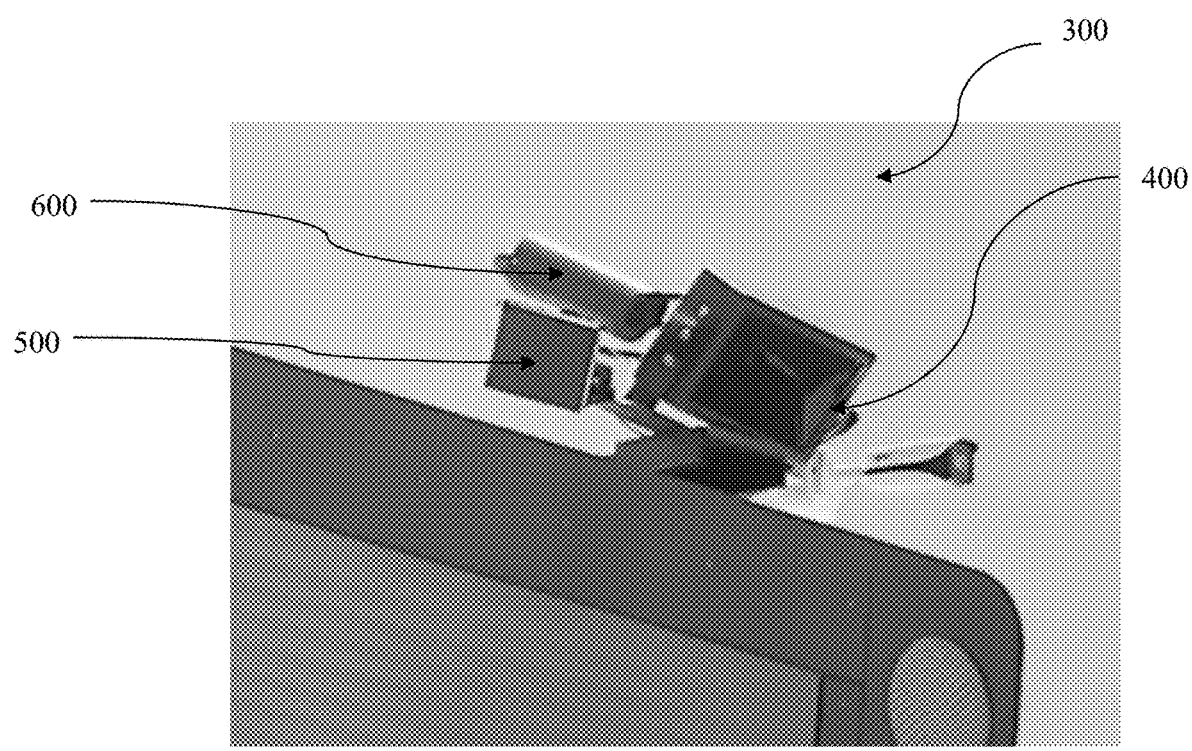
FIG. 6C shows a gantry mounted device according to one embodiment of the invention and incorporating the flash of FIG. 6A.

FIG. 6C shows one embodiment of a gantry mounted device 300 in which the flash 400, radar 500 and camera 600 can be readily seen.

Advantageously, the sensor type selected maximises light sensitivity and minimises noise, permitting high quality low-light images. The sensor may have excellent dynamic range, which advantageously, overcomes problems associated with 'plate burn', whereby the backing of the license plate is overexposed due to flash energy, which then also overexposes the lettering too making the plate illegible. The sensor used may be fairly unique in its ability to overcome this. By excellent dynamic range is meant a range comprising at least 66 dB; or greater than 70 dB.

Most sensors are rolling-shutter, which presents image distortion for fast moving objects. When a global shutter camera is utilised, all pixels may be exposed simultaneously and therefore have no motion-based distortion.

In one embodiment, the one or more camera's IR-blocking filter is removed, so that it is sensitive to infrared light.

In the embodiment used to capture the images shown in the Figures, the one or more camera was monochrome to improve light sensitivity and image sharpness. In other embodiments, a colour camera is used with reduced image quality as a result.

To avoid motion-blur, the exposure time of the one or more camera comprises at the slowest 0.5 ms (½₀₀₀th), and should ideally be set to 0.1 ms (⅟₁₀₀₀₀th). The exposure time may comprise 0.05 ms to 0.5 ms or more typically may comprise 0.1 to 0.3 ms. In practice 0.2 ms (⅟₅₀₀₀th) is typically used. These settings ensure crisp images for vehicles travelling at 100 km/h and will still provide acceptable images for vehicles travelling as fast as 300 km/h.

The resolution of the one or more camera may be high enough to provide sufficiently accurate evidence that one can identify that the object in the person's hand is clearly a phone or mobile device and not another object.

The inventor found that video camera resolution (2MP) is insufficient. Testing with both 9MP and 12MP, showed that at minimum 5MP is required. Higher resolutions, e.g. 20MP+, have other problems such as higher sensor noise, lower sensitivity or high cost.

By taking multiple images, the license plate may be captured in an earlier photo and the distracted driving evidence in a later photo. To capture the license plate, the exposure settings of the camera may be reduced (e.g. lower gain and exposure time), while to capture the distracted driving behaviour, the exposure settings of the camera should be increased, with a higher gain and exposure time. For example, a plate image may be exposed at a level of 1% to 50% relative magnitude of the infringing act setting. In one particular embodiment, the plate image is exposed at 5%.

The camera settings can be changed rapidly and automatically between the capture of each image to facilitate this. If this is not done, the images of phone or mobile device use will be too dark and lack detail, and the license plates will be too bright, overexposed by flash, and risk illegibility. Other options to solve this can be utilized, for example by changing flash intensity between images or by using a separate offset flash for illumination and thereby detection of license plates, or by using another camera for license plates.

In one embodiment, a C mount lens is used which allows for a good depth of field, all things in focus, even at the very wide apertures needed for the application. In other embodiments a larger format camera may be utilised. This is because it is a narrower lens than larger format lenses. The lens selected may comprise a fixed focus lens such as, an industrial fixed focal length lens, with a rating of 12MP. The rating may match or exceed the sensor to avoid image blur. In other embodiments, a varifocal lens may be utilized.

In the embodiment shown in FIG. 6B, the narrow band filter is applied to the front of the lens, which lets through only the wavelengths produced by the comprised one or more flash. In other embodiments, the narrow band filter is applied behind the lens. This filter eliminates the majority of the light produced by the sun and/or ambient light, thereby eliminating most glare.

The narrow band filter may block all light or substantially all light except that light at or around a particular wavelength. One example narrow band filter that has been implemented is the Bi850 Near-IR Interference Bandpass Filter, which is described as having a useful range of 845 to 860 nm, that is 15 nm. This narrow band filter is available from Midwest Optical Systems, Inc., 322 Woodwork Lane, Palatine, IL, 60067, USA. From the teaching herein, a skilled person is readily able to select a suitable narrow band filter.

Two flash options may be provided. A first at 760 nm and a second at 850 nm. One or both of these flash options may be comprised.

The filter used with the 850 nm flash may let through light only or substantially only between 840 and 860 nm, thereby eliminating 98% of the available sunlight that would otherwise be seen by the sensor. In other embodiments, the light let through may be between 700 and 1000 nm; 750 and 950 nm; 800 and 900 nm; 820 and 890 nm; 820 and 880 nm; or 850 and 870 nm. In the embodiment shown in FIG. 6B, the one or more filter eliminates 97.5% of the light normally visible by the camera and lets through only the light at the same wavelength as the one or more flash. In other embodiments, the one or more filter eliminates about 90%; or about 95% of the light normally visible by the camera, letting through only the light at the same wavelength as the one or more flash.

The narrow band filter may comprise a wavelength band of less than 5 nm; 5; 10; 15; 20; 25; 30; 35; 40; 45; 50; 55; 60; 65; 70; 75; 80 85; 90; 95; 100; 110; 120; 130; 140; 150; 200; 250; 300; 350; 400; 450; or 500 nm. The narrow band filter may comprise a wavelength band of 5 nm or less; 10 nm or less; 15 nm or less; 20 nm or less; 25 nm or less; 30 nm or less; 35 nm or less; 40 nm or less; 45 nm or less; 50 or less; 55 nm or less; 60 nm or less; 65 nm or less; 70 nm or less; 75 nm or less; 80 nm or less; 85 nm or less; 90 nm or less; 95 nm or less; or 100 nm or less.

The lenses used may have a focal length of 35 mm for mobile installation which has a lower mount height and 50 mm for fixed installation which comprise a higher mount height. The focal length may be selected to provide tight zoom onto the vehicle for higher resolution of the evidence. Enough width and context may be provided to show one or more of the entire width of the vehicle, most of the lane and its number plate.

A polarizer may or may not be used to additionally reduce glare from the sun.

Advantageously, the one or more flash may be capable of firing 40,000 times per day at high intensity but short duration without breaking. In other embodiments, the one or more flash may be capable of firing 10,000 to 100,000; 20,000 to 80,000 or 30,000 to 50,000 times per day at high intensity and short duration. The one or more flash may be required to fire twice or more for each vehicle. Traditional Xenon flashes are not capable of such high repetition rates, so LED or laser technology may be used. Xenon flashes are also wide-spectrum while LEDs and lasers can be narrow-spectrum.

FIGS. 6A and 6B show one embodiment of a custom design one or more flash 400 comprising 384 IR LEDs, tightly aimed using individual lenses at 22 degrees comprised within a vehicle mounted device 300 according to one embodiment of the invention. Large capacitor banks may store charge between flashes, and then when triggered the LEDs may generate a high intensity of light for a very short duration.

The one or more flash may comprise one or more light source. The one or more light source may comprise one or more LED light source and/or one or more laser light source. The one or more light source may comprise a narrow-spectrum. The one or more flash may comprise one or more light source. The one or more flash may comprise 10 to 1,000; 40 to 500; or 300 to 400 light sources. Each of the one or more light sources may comprise an IR LED light source.

In other embodiments, the individual lenses may be at 1 to 35; 15 to 30; or 20 to 25 degrees The LED wavelength may be tightly controlled to ensure light is provided within a determined spectral band, and a camera filter may be used to exclude all light not within that band.

The tightly controlled wavelength may comprise a narrow spectrum light source transmitting the majority of its emitted light within 5; 10; 20; 25; 30; 35; 40; 45; or 50 nm of its central wavelength.

In one particular embodiment, the one or more light source may comprise an Oslon Black, Oslon Black Series 850 nm −80°, SFH 4715AS available from Osram Opto Semiconductors.

The spectral bandwidth may be determined at 50% Irel, max full width at half maximum (FWHM).

Both 760 nm and 850 nm flash variants have been used and tested. At 760 nm, the camera is more sensitive, however the LEDs available are not as bright as 850 nm ones. Typical vehicle windshields let through more light at 760 nm than 850 nm. A small red glow can be noticed from each flash at 760 nm. 850 nm is a more common IR wavelength and is more invisible to drivers. The filtering available at 850 nm is tighter than at 760 nm, allowing more sun exclusion and therefore glare reduction. Both approaches are viable and with other LED providers, almost any wavelength can be used between 730 nm and 950 nm provided that it is narrow and not broad.

The inventor has unexpectedly discovered that high angles into the vehicle may be required in order to see a phone or mobile device held low behind the steering wheel. As much as 80 degrees vertical from ground plane to camera may be used. At minimum, 40 degrees may be required. Typically, trucks may require lower angles and passenger cars may require higher angles. These high view angles may necessitate high mount positions, of at minimum 4 m and typically 7 m to 10 m above the road surface.

The angle may comprise 30 to 90; 35 to 90; or 40 to 90 degrees vertical from a ground plane to camera. In one embodiment the angle may comprise 65 degrees. The angle may comprise 30; 31; 32; 33; 34; 35; 36; 37; 38; 39; 40; 41; 42; 43; 44; 45; 46; 47; 48; 49; 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89 or 90 degrees vertical from the ground.

When a lower mount is used or a mount to the side of the road is used, horizontal angle may be used to compensate for a lack of vertical angle. An angle of up to 45 degrees horizontal permits a view into the cabin without obstruction by the A pillar.

A camera mount position comprising a horizontal angle of between −70 and 70; −45 and 45 and −30 to 30 degrees may be utilised. In roadside use, the horizontal angle may comprise up to 45 degrees. In an over-the-lane use, the horizontal angle may comprise 0 degrees. The over-the-lane use case may comprise a fixed installation of a high camera.

The inventor has found that the one or more camera may be placed to the passenger side of the vehicle rather than the driver's side of the vehicle. This is because testing indicated that human behaviour preferences using the phone or mobile device on the side with more space available. This is to the left for a right-hand drive vehicle.

By taking multiple images of each vehicle, a single camera may be used to provide evidence at different view angles, enhancing the chance of obtaining evidence of phone or mobile device use.

A video camera may also be provided to provide additional context, wider field of view and sustained evidence of distraction over several seconds. Licence plates may also be pulled from the video.

The infringement data comprising the one or more image may be packaged into an SQLite database file, and may then be encrypted using a randomly generated AES symmetric key. The AES key may then be encrypted using an RSA public key and packaged with the infringement file. The file may only be unencrypted if one has the RSA private key in order to access the AES key. The data in the file may be hashed and encrypted using a private key. The hash may be checked using the public key. If the file evidence has been tampered with, the hash will not match.

A computer such as, computer device 201, may be connected to the device at the site. The connection may comprise an Ethernet connection. The computer may be placed up to 100 m away or mounted within 5 m. The computer may utilize one or more graphics card to improve processing speed as required based on application. A Linux operating system may be used.

Advantageously, automation may be used to reduce the image load from the camera, i.e. to ignore images of operators not using a phone or mobile device. Radio Frequency (RF) monitoring approaches cannot be used as they do not work for detecting data transmission related activities or passive (non-transmitting) mobile device usage such as watching content stored on the phone or mobile device. In one embodiment, image analysis is used to determine those vehicle operators using a phone or mobile device.

Two example automation methods are provided herein. A first classifies an image as showing a driver using a phone or mobile device, and the other detects a phone or mobile device in an image and reports its location.

In the first example automation method, the location of the vehicle operator in the one or more image is determined. This may be done by steering wheel detection and/or person detection. The one or more image may then be cropped to generate an image showing only the vehicle operator and the operator's immediate surrounds which may be defined by a wingspan. This may capture the operator and wherever the operator's hands can reasonably reach. The cropped image may then be presented to a classifier. The classifier may then evaluate whether the image shows an operator clearly using a phone or mobile device, an operator clearly not using a phone or mobile device or an uncertain classification. The classification may provide a confidence score of each categorization. When on-phone or mobile device use confidence exceeds a threshold and/or non-on-phone or non-on-mobile device use is lower than a threshold, the image may be sent for further review.

In the second automation method, the entirety of the one or more image may be searched for a phone or mobile device using a neural network such as, a deep convolutional neural network. If a phone or mobile device is identified, based on its confidence score the one or more image may be sent for further review. Some images may be automatically excluded if the phone or mobile device is associated with a passenger instead of the operator. Some images may be automatically excluded if the phone or mobile device is detected in a holder rather than being grasped by hand.

According to any automation method, the one or more cropped image may comprise a standardised image. The cropped image may be created using a standard width and height centred or substantially centred on the driver coordinate. The width and height may be chosen to capture complete detail of the driver and exclude any passengers. In cases where the driver coordinate is close to the edge of the camera field of view, the cropped image may be padded with grey so that the driver coordinate remains in the centre and the cropped image comprises a standard size. Each cropped image may then be analysed to determine the brightest and darkest pixels. An offset may be applied to all pixels in the crop so that the darkest pixels becomes set to zero (0), i.e. black. A scale may then be applied to all pixels in the crop so that the brightest pixels becomes set to a value of 255, i.e. white. All other pixels may be linearly scaled between 0 and 255 in a histogram equalisation operation. The overall effect may be to maximise contrast in the region of interest. A final processing stage may be applied whereby the cropped image is resized so that the resulting electronic file, e.g. jpeg, comprises a standard filesize.

Additionally, according to any automation method, the one or more cropped image may be adjusted to comprise a standardised brightness and/or standardised contrast. The image adjustment may be automatic such as by computer processing.

The automated recognition process cannot operate with 100% accuracy. To catch all offenders, images that do not contain phone or a mobile device use will also be flagged. In a fully automated system, some or many offenders will be missed. Therefore, the further review may comprise a manual review step. To avoid excessive data bandwidth, this further review may be done via a multi-stage process.

The automatic analysis may comprise a detection. In one embodiment, the detection of a phone or mobile device comprises searching the one or more image for a phone or mobile device. The search may comprise a neural network or artificial neural network such as a deep neutral network or a deep convolutional neural network. The search may be of an entire image. If a phone or mobile device is detected, based on its confidence score the one or more image may be sent for further review. One or more image may be excluded if a detected phone or mobile device is associated with a passenger and not a vehicle operator or driver. On the other hand, one or more image may be automatically excluded if the phone or mobile device is detected in a holder and not grasped by hand.

The captured and/or received image may comprise a view of the complete front of the vehicle and the lane the vehicle is in.

The neural network may comprise an object detection system. The object detection system may use a neural network based YOLO (you only look once) real time object detection architecture such as, described at https://pjreddie.com/darknet/yolo/.

The neural network may comprise an image classifier. The image classifier may comprise a neural network based VGG (Visual Geometry Group) classifier. The classifier may receive the one or more cropped image. The classifier may be pre-trained such as by training on a data set such as, the 1,000 class ImageNet set. The model may be modified to identify only two classes: received cropped images containing illegal phone or mobile device use, i.e. positive, and received cropped images not containing illegal phone or mobile device use, i.e. negative. The classifier may have been trained by fine tuning on a training set of example images. The example images may comprise, more than one hundred, more than one thousand, more than a hundred thousand, or more than one million example images such as, cropped images. The training set may comprise positive and negative labelled images. When the received cropped image of the driver is fed into the classifier network, the analysis may determine as output a confidence that the image is positive for phone or mobile device use. The determined confidence may comprise for example a confidence output of 0% is very unlikely to show phone or mobile device use and a confidence output of 100% is very likely to show phone or mobile device use. A threshold may be used to limit which images are deemed positive and which are deemed negative. The threshold may comprise a threshold value which may be dynamically adjusted so that a top margin of images are deemed positive and sent on for manual review. The top margin may comprise a top 5; 10; 15; 20; or 25% of received cropped images with respected to determined confidence.

The analysis may comprise a real time object detector. The real time object detector may identify the driver by the presence of a steering wheel and the human behind that wheel. The training set may comprise images from various angles optionally, both vertical and horizontal angle variations, so that the solution can be deployed in any use case and still detect drivers. The training set may comprise images of many different vehicle types, and optionally images of both left hand drive vehicles and right hand drive vehicles. The analysis may comprise a positive identification of the driver and ignore passengers. The real time object detector may output a location of the driver in the image and optionally a confidence score the driver has been found.

According to any one of the above forms, when the driver has been located in the received image, the received image may be cropped.

The standardised one or more cropped image may be supplied to the image classifier. The image classifier may receive the standardised one or more cropped image. The image classifier may have been trained on a training set comprising a plurality of driver cropped image examples. The training set contains labelled images of drivers illegally touching phones or mobile device, non-illegally touching phones or mobile device, and not touching phones or mobile devices at all. When the image of the driver is received by the image classifier, an output comprising a most likely category and a confidence score of making that determination may be provided. The most likely category may be selected from: a) on-phone or mobile device or b) not-on-phone or mobile device).

The classification may comprise determining the location of a driver in the one or more image. The determination of the location may comprise steering wheel detection and/or person detection. After determination the one or more image may be cropped to generate an image showing only the driver and the driver's immediate surrounds. The immediate surround may comprise a driver's wingspan. The cropped image may then be provided for further review.

When one or more image has been detected with a high confidence level of showing phone or mobile device use, the data transfer and review system is activated. This may comprise: cropping of the operator generated on the camera system; uploading the cropped one or more image to a server; an operator logging in to an 'image review' website; the operator may be presented with an image and may be prompted to select one of four options: 1) On Phone or mobile device; 2) Not on Phone or mobile device; 3)Uncertain; 4) Other; when 1); 3) or 4) are selected a message is sent to the camera system; the operator may be presented with the next image to review; the one or more camera system may initiate a transfer of the full encrypted infringement file, which may be sorted according to the option selected, which may for example be transfer to the 'On Phone or mobile device' folder; client may download the infringement file from the cloud storage; and client may unencrypt and extract the infringement file data, processing that data as it would a red light or speed offence The server may comprise a cloud server. Currently, AWS SQS is used. The logging in may comprise entering login credentials.

A typical driver crop is about 100 kB, while an infringement package may be 2 MB to 10 MB (depending on image and video options). By only uploading infringements when they are proven to contain data, a large amount of bandwidth is advantageously saved.

Another advantage of the invention is that a confidence threshold to initiate data review may be adjusted based on the needs of the client. For example, a setting anywhere on the spectrum of 0% of offences missed, 100% of images processed manually to 100% of offences missed, 0% of images processed manually may be selected. A typical setting may be 5% missed for 10% manual processing for example.

There are different examples of use case. In a road authority use case, the enforcement camera method, device and system operates in a similar method to a red light camera system operates. The one or more camera is permanently mounted and operates 24/7. It may capture evidence of all illegal phone or mobile device use, and that evidence may be submitted to a central processing centre for infringement processing. That centre may perform a registration lookup, and may sends a fine notice in the mail to the registered owner.

In a Road Authority Use Case-Mobile, instead of the one or more camera being fixed, they may be vehicle or trailer mounted. The one or more camera may be driven to a location and temporarily activated. The one or more camera may be rotated through different locations on a schedule to provide more coverage. This model is very similar to how mobile speed operations are conducted. The processing of the data is almost identical to the fixed use case.

Another use case is a Policing Use Case. In the policing use case, the method, device and system is deployed in conjunction with a manned Police operation. The Police operation may be dedicated to the distracted driving task, or may be conducting other operations such as drink driving checks, registration checks or incident response.

Typically, a mobile vehicle or trailer mounted camera system may be deployed, in the same way as the mobile road authority use case, although the method, device and system may also be deployed using a portable tripod solution. The method, device and system may capture one or more image of each passing vehicle. If the method, device and system detects a high likelihood of mobile computer device use, the image may be transmitted to the Police operation. The one or more image may be reviewed by a human process to reduce burden on the Police, either via an internet connected remote review service or by having a dedicated person deployed with the camera system.

The Police operation may view the one or more image via a convenient method, such as on a phone or mobile device such as a smart phone or a tablet computer or other mobile device. The one or more image data will show the offender, vehicle type and license plate. The Police may then wait for the target vehicle to approach them, and intercept them to serve an on-the-spot offence.

The method, device and system may also be used for speed or average speed enforcement; use more than one camera to provide additional angles into to the cabin to enhance prosecutability; use more than one camera to provide depth information via stereoscopic means to enhance detection accuracy; provide a real-time display of offences to a variable message sign, showing images of the offending drivers; provide survey services, showing the prevalence of the behaviour by time of day, vehicle type, location or other parameter or variable.

Figure 2A:
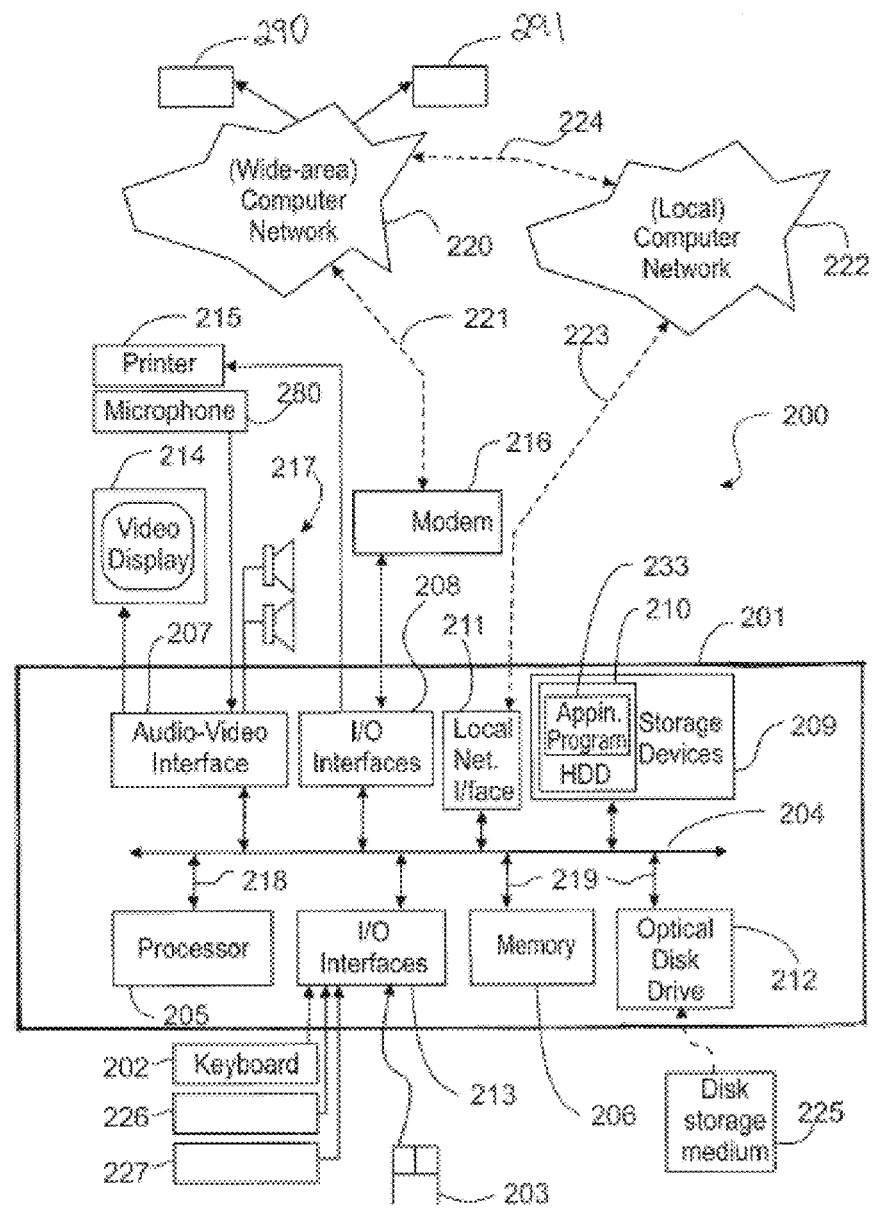
FIGS. 2A and 2B are schematic diagrams showing one embodiment of a computing device and computer system according to the invention.
Figure 2B:
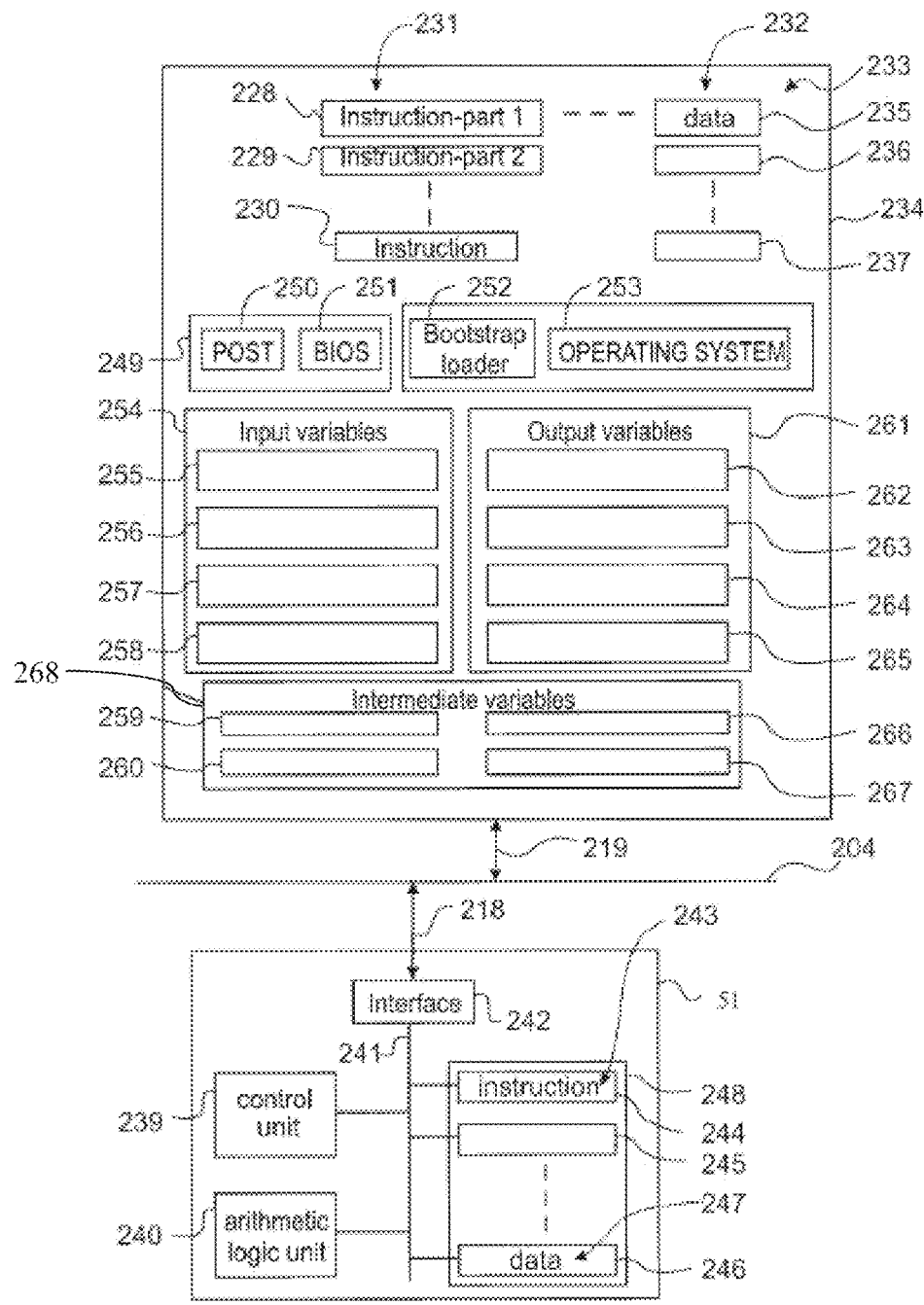

One embodiment of a computer system 200 and computer device 201 suitable for use in the present invention is shown in FIGS. 2A and 2B. In the embodiment shown computer system 200 comprises a computer device 201 comprising input devices such as a keyboard 202, a mouse pointer device 203, a scanner 226, an external hard drive 227, and a microphone 280; and output devices including a printer 215, a display device 214 and loudspeakers 217. In some embodiments video display 214 may comprise a touchscreen.

A Modulator-Demodulator (Modem) transceiver device 216 may be used by the computer device 201 for communicating to and from a communications network 220 via a connection 221. The network 220 may be a wide-area network (WAN), such as the Internet, a cellular telecommunications network, or a private WAN. Through the network 220, computer device 201 may be connected to other similar personal devices 290 or server computers 291. Where the connection 221 is a telephone line, the modem 216 may be a traditional "dial-up" modem. Alternatively, where the connection 221 is a high capacity (e.g.: cable) connection, the modem 216 may be a broadband modem. A wireless modem may also be used for wireless connection to network 220.

The computer device 201 typically includes at least one processor 205, and a memory 206 for example formed from semiconductor random access memory (RAM) and semiconductor read only memory (ROM). The device 201 also includes a number of input/output (I/O) interfaces including: an audio-video interface 207 that couples to the video display 214, loudspeakers 217 and microphone 280; an I/O interface 213 for the keyboard 202, mouse 203, scanner 226 and external hard drive 227; and an interface 208 for the external modem 216 and printer 215. In some implementations, modem 216 may be incorporated within the computer device 201, for example within the interface 208. The computer device 201 also has a local network interface 211 which, via a connection 223, permits coupling of the computer system 200 computer device 201 to a local computer network 222, known as a Local Area Network (LAN).

As also illustrated, the local network 222 may also couple to the wide network 220 via a connection 224, which would typically include a so-called "firewall" device or device of similar functionality. The interface 211 may be formed by an Ethernet circuit card, a Bluetooth wireless arrangement or an IEEE 802.11 wireless arrangement or other suitable interface.

The I/O interfaces 208 and 213 may afford either or both of serial and parallel connectivity, the former typically being implemented according to the Universal Serial Bus (USB) standards and having corresponding USB connectors (not illustrated).

Storage devices 209 are provided and typically include a hard disk drive (HDD) 210. Other storage devices such as, an external HD 227, a disk drive (not shown) and a magnetic tape drive (not shown) may also be used. An optical disk drive 212 is typically provided to act as a non-volatile source of data. Portable memory devices, such as optical disks (e.g.: CD-ROM, DVD, Blu-Ray Disc), USB-RAM, external hard drives and floppy disks for example, may be used as appropriate sources of data to the personal device 200. Another source of data to personal device 200 is provided by the at least one server computer 291 through network 220.

The components 205 to 213 of the computer device 201 typically communicate via an interconnected bus 204 in a manner that results in a conventional mode of operation of personal device 200. In the embodiment shown in FIGS. 2A and 2B, processor 205 is coupled to system bus 204 through connections 218. Similarly, memory 206 and optical disk drive 212 are coupled to the system bus 204 by connections 219. Examples of personal devices 200 on which the described arrangements can be practiced include IBM-PC's and compatibles, Sun Sparc stations, Apple computers; smart phones; tablet computers or like a device comprising a computer module like computer device 201. It is to be understood that when personal device 200 comprises a smart phone or a tablet computer, display device 214 may comprise a touchscreen and other input and output devices may not be included such as, mouse pointer device 203; keyboard 202; scanner 226; and printer 215.

FIG. 2B is a detailed schematic block diagram of processor 205 and a memory 234. The memory 234 represents a logical aggregation of all the memory modules, including the storage device 209 and semiconductor memory 206, which can be accessed by the computer device 201 in FIG. 2A.

The methods of the invention may be implemented using computer device 200 wherein the methods may be implemented as one or more software application programs 233 executable within computer device 201. In particular, the steps of the methods of the invention may be effected by instructions 231 in the software carried out within the computer device 201

The software instructions 231 may be formed as one or more code modules, each for performing one or more particular tasks. The software 233 may also be divided into two separate parts, in which a first part and the corresponding code modules performs the method of the invention and a second part and the corresponding code modules manage a graphical user interface between the first part and the user.

The software 233 may be stored in a computer readable medium, including in a storage device of a type described herein. The software is loaded into the personal device 200 from the computer readable medium or through network 221 or 223, and then executed by personal device 200. In one example the software 233 is stored on storage medium 225 that is read by optical disk drive 212. Software 233 is typically stored in the HDD 210 or the memory 206.

A computer readable medium having such software 233 or computer program recorded on it is a computer program product. The use of the computer program product in the personal device 200 preferably effects a device or apparatus for implementing the methods of the invention.

In some instances, the software application programs 233 may be supplied to the user encoded on one or more disk storage medium 225 such as a CD-ROM, DVD or Blu-Ray disc, and read via the corresponding drive 212, or alternatively may be read by the user from the networks 220 or 222. Still further, the software can also be loaded into the personal device 200 from other computer readable media. Computer readable storage media refers to any non-transitory tangible storage medium that provides recorded instructions and/or data to the computer device 201 or personal device 200 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer device 201. Examples of transitory or non-tangible computer readable transmission media that may also participate in the provision of software application programs 233, instructions 231 and/or data to the computer device 201 include radio or infra-red transmission channels as well as a network connection 221, 223, 334, to another computer or networked device 290, 291 and the Internet or an Intranet including email transmissions and information recorded on Websites and the like.

The second part of the application programs 233 and the corresponding code modules mentioned above may be executed to implement one or more graphical user interfaces (GUIs) to be rendered or otherwise represented upon display 214. Through manipulation of, typically, keyboard 202, mouse 203 and/or screen 214 when comprising a touchscreen, a user of personal device 200 and the methods of the invention may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers 217 and user voice commands input via microphone 280. The manipulations including mouse clicks, screen touches, speech prompts and/or user voice commands may be transmitted via network 220 or 222.

When the computer device 201 is initially powered up, a power-on self-test (POST) program 250 may execute. The POST program 250 is typically stored in a ROM 249 of the semiconductor memory 206. A hardware device such as the ROM 249 is sometimes referred to as firmware. The POST program 250 examines hardware within the computer device 201 to ensure proper functioning, and typically checks processor 205, memory 234 (209, 206), and a basic input-output systems software (BIOS) module 251, also typically stored in ROM 249, for correct operation. Once the POST program 250 has run successfully, BIOS 251 activates hard disk drive 210. Activation of hard disk drive 210 causes a bootstrap loader program 252 that is resident on hard disk drive 210 to execute via processor 205. This loads an operating system 253 into RAM memory 206 upon which operating system 253 commences operation. Operating system 253 is a system level application, executable by processor 205, to fulfill various high level functions, including processor management, memory management, device management, storage management, software application interface, and generic user interface.

Operating system 253 manages memory 234 (209, 206) in order to ensure that each process or application running on computer device 201 has sufficient memory in which to execute without colliding with memory allocated to another process. Furthermore, the different types of memory available in the personal device 200 must be used properly so that each process can run effectively. Accordingly, the aggregated memory 234 is not intended to illustrate how particular segments of memory are allocated, but rather to provide a general view of the memory accessible by computer device 201 and how such is used.

Processor 205 includes a number of functional modules including a control unit 239, an arithmetic logic unit (ALU) 240, and a local or internal memory 248, sometimes called a cache memory. The cache memory 248 typically includes a number of storage registers 244, 245, 246 in a register section storing data 247. One or more internal busses 241 functionally interconnect these functional modules. The processor 205 typically also has one or more interfaces 242 for communicating with external devices via the system bus 204, using a connection 218. The memory 234 is connected to the bus 204 by connection 219.

Application program 233 includes a sequence of instructions 231 that may include conditional branch and loop instructions. Program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, processor 205 is given a set of instructions 243 which are executed therein. The processor 205 then waits for a subsequent input, to which processor 205 reacts by executing another set of instructions. Each input may be provided from one or more of a number of sources, including data generated by one or more of the input devices 202, 203, or 214 when comprising a touchscreen, data received from an external source across one of the networks 220, 222, data retrieved from one of the storage devices 206, 209 or data retrieved from a storage medium 225 inserted into the corresponding reader 212. The execution of a set of the instructions may in some cases result in output of data. Execution may also involve storing data or variables to the memory 234.

The disclosed arrangements use input variables 254 that are stored in the memory 234 in corresponding memory locations 255, 256, 257, 258. The described arrangements produce output variables 261 that are stored in the memory 234 in corresponding memory locations 262, 263, 264, 265. Intermediate variables 268 may be stored in memory locations 259, 260, 266 and 267.

The register section 244, 245, 246, the arithmetic logic unit (ALU) 240, and the control unit 239 of the processor 205 work together to perform sequences of micro-operations needed to perform "fetch, decode, and execute" cycles for every instruction in the instruction set making up the program 233. Each fetch, decode, and execute cycle comprises: (a) a fetch operation, which fetches or reads an instruction 231 from memory location 228, 229, 230; (b) a decode operation in which control unit 239 determines which instruction has been fetched; and (c) an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the methods of the invention may be associated with one or more segments of the program 233, and may be performed by register section 244-246, the ALU 240, and the control unit 239 in the processor 205 working together to perform the fetch, decode, and execute cycles for every instruction in the instruction set for the noted segments of program 233.

One or more other computers 290 may be connected to the communications network 220 as seen in FIG. 2A. Each such computer 290 may have a similar configuration to the computer device 201 and corresponding peripherals.

One or more other server computer 291 may be connected to the communications network 220. These server computers 291 response to requests from the personal device or other server computers to provide information.

Method 100 may alternatively be implemented in dedicated hardware such as one or more integrated circuits performing the functions or sub functions of the described methods. Such dedicated hardware may include graphic processors, digital signal processors, or one or more microprocessors and associated memories.

It will be understood that in order to practice the methods of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. It will be understood, however, that the processing performed by two distinct components as described above may in accordance with a further embodiment of the invention be performed by a single component. Further, the processing performed by one distinct component as described above may be performed by two distinct components. In a similar manner, the memory storage performed by two distinct memory portions as described above may in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, a telecommunications network (e.g., a cellular or wireless network) or any client server system that provides communication, for example. Such communications technologies may use any suitable protocol such as TCP/IP, UDP, or OSI, for example.

The following non-limiting examples illustrate the invention. These examples should not be construed as limiting: the examples are included for the purposes of illustration only. The Examples will be understood to represent an exemplification of the invention.

EXAMPLES

Tripod Deployment-Day-No Flash

Figure 3A:
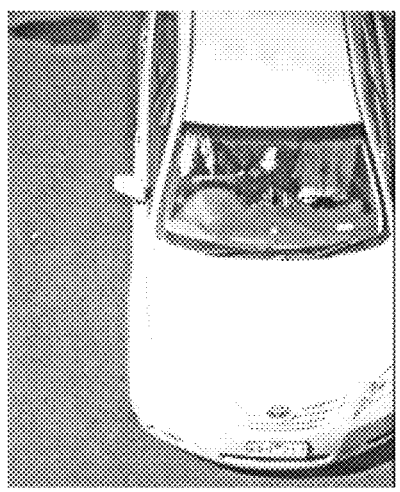
Figure 3B:
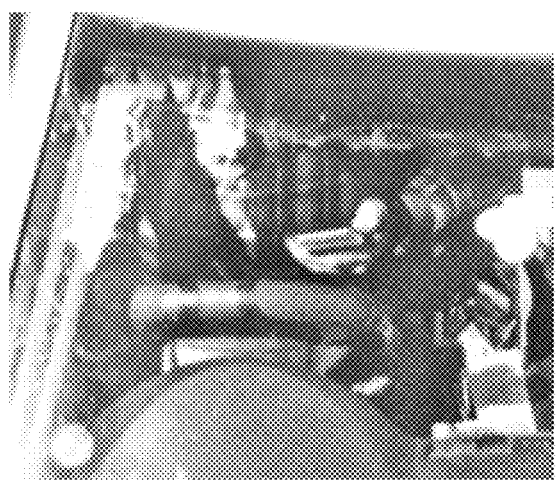
Figure 3C:
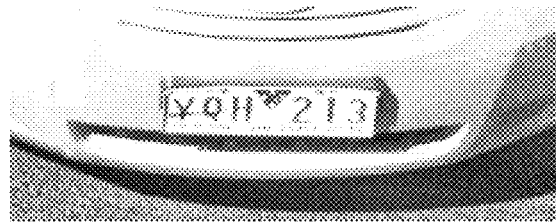
Figure 3D:
Figure 3H:
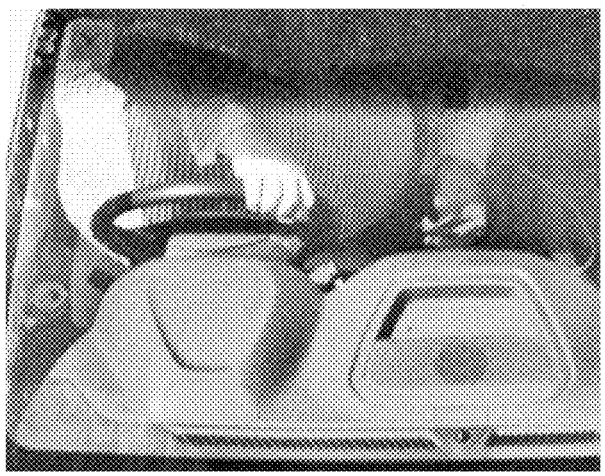

FIGS. 3A to 3E show images captured according to the invention using a tripod deployment with images captured during the day and with no flash. FIGS. 3A and 3B allowed detection of using a mobile phone; with FIG. 3B a zoomed in image. FIG. 3C shows that capture and reading of the license plate to be possible. FIG. 3D allowed detection of use of a mobile phone and travelling at a speed ten percent greater than the limit. FIG. 3E allowed detection of hand outside the vehicle and not on wheel.

FIGS. 3F; 3G; and 3H show other example images showing use of a mobile phone.

Vehicle Deployment-Day-Flash

Figure 4A:
FIGS. 4A to 4F show example images captured with a vehicle deployment during the day with a flash according to another embodiment of the invention.
Figure 4B:
Figure 4C:
Figure 4D:
Figure 4E:
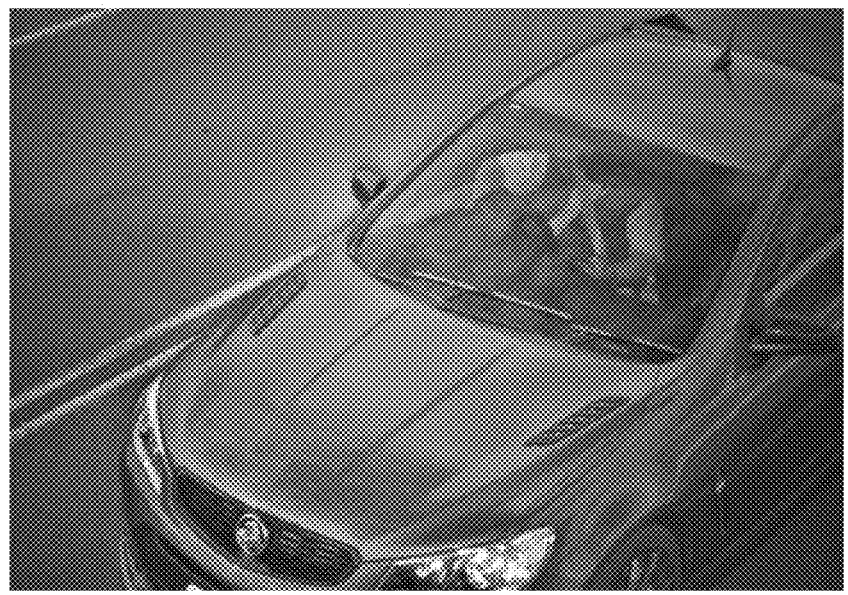
Figure 4F:
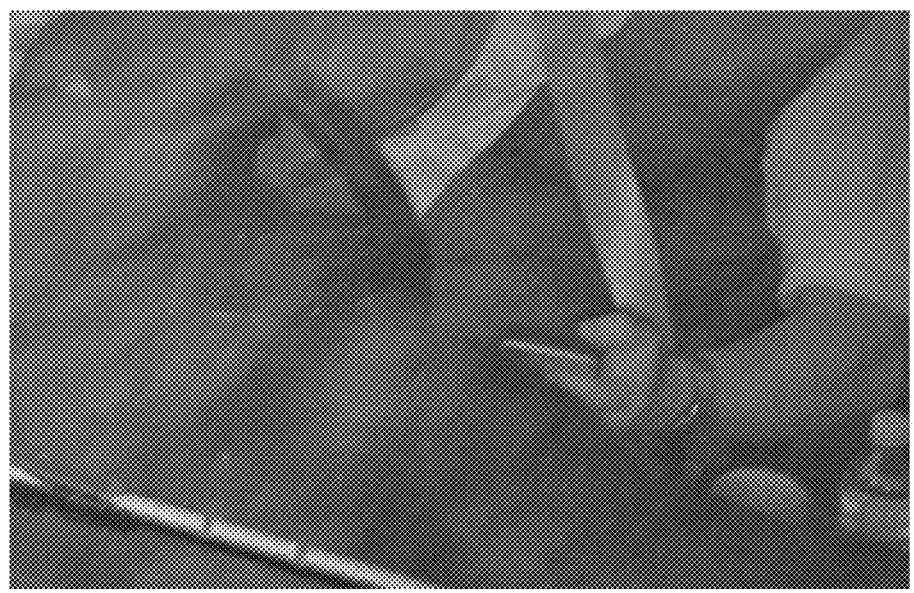

FIGS. 4A and 4B; 4C and 4D; and 4E and 4F; are pairs of images captured according to the invention using a vehicle deployment. The images were captured during the day with a flash. FIGS. 4B; 4D; and 4F are zoomed in to better show the mobile phone use of the images of FIGS. 4A; 4C; and 4E, respectively.

Vehicle Deployment-Night-Flash

Figure 5A:
FIGS. 5A to 5D show example images captured with a vehicle deployment during the night with a flash according to another embodiment of the invention.
Figure 5B:
Figure 5C:
Figure 5D:

FIGS. 5A and 5B; and 5C and 5D are pairs of images captured according to the invention using a vehicle deployment. The images were captured during the night with a flash. FIGS. 5B; and 5D are zoomed in to better show the mobile phone use of the images of FIGS. 5A; and 5C, respectively. FIGS. 5C and 5D show that advantageously, the invention is able to detect the infringement in a far lane.

Example Deployments

Figure 7A:
FIG. 7A shows a trailer or mobile based device according to one embodiment of the invention.
Figure 7B:
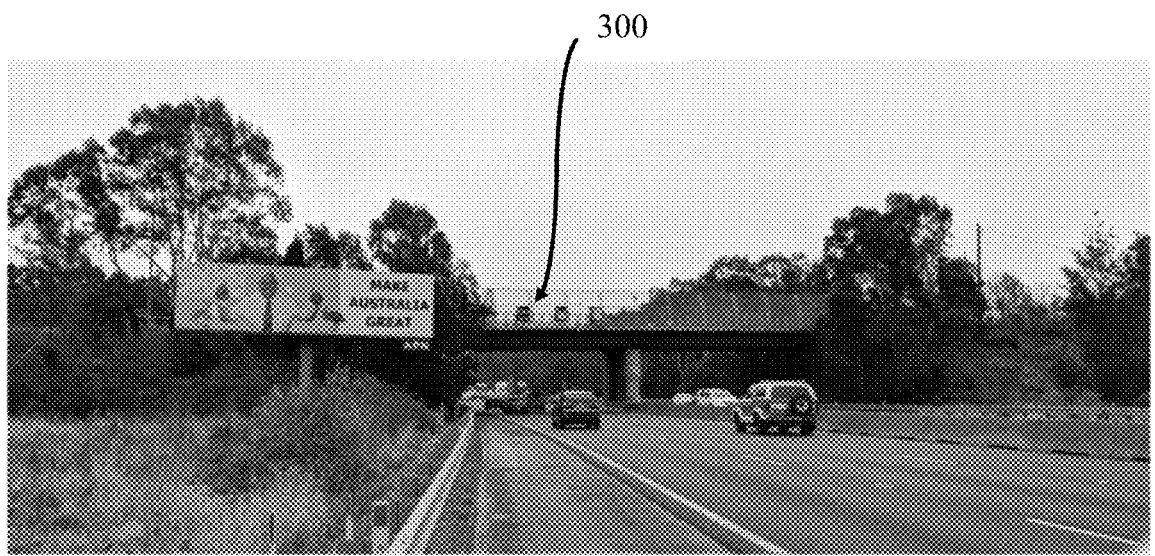
FIG. 7B shows a fixed device according to another embodiment of the invention deployed in this example on an overpass.
Figure 7C:
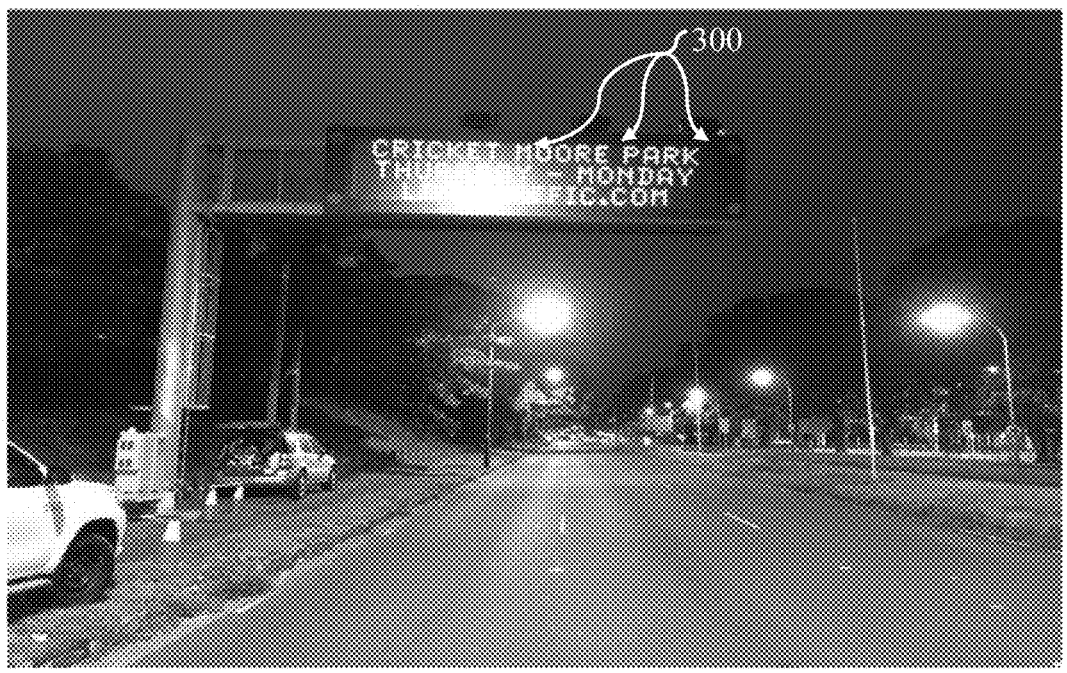
FIG. 7C shows another fixed device according to another embodiment of the invention deployed in this example on a gantry for a variable message sign (VMS).

The device of the invention has been successfully deployed in a mobile embodiment, in one example on a trailer, see FIG. 7A which shows deployment in the Southern Highlands of New South Wales, Australia; and in various fixed embodiments, see FIG. 7B which shows deployment on an overpass above the M4 Motorway in New South Wales, Australia; and FIG. 7C which shows deployment on a gantry for a variable message sign (VMS) along Anzac Parade in Sydney, Australia.

Figure 8A:
FIG. 8A shows an example captured image in one successful deployment of the device and method according to one embodiment of the invention.

These example deployments resulted in successful image capture showing driver's using mobile phones. An example image is shown in FIG. 8A.

Six fixed site deployments in Australia were conducted to operate continuously for 90 days in early 2019. During these deployments 8,066,292 vehicle transits were captured and analysed. From the 8,066,292 transits, 95,445 drivers were positively identified to be illegally using a phone. The deployments occurred at roads with speed limits of between 70 km/h and 100 km/h.

Six trailer based deployments in Australia were conducted in mid 2019 for a cumulative total of 42 days of operation. During these deployments 446,367 vehicle transits were captured, with 8,438 drivers identified to be illegally using a mobile phone. The deployments occurred at roads with speed limits varying from 60 km/h to 90 km/h.

In another trailer-based deployment in Tasmania, Australia, the device of the invention was deployed for 36 hours continuously, monitoring a single lane of traffic. The device of the invention captured evidence of 446 drivers illegally using a phone, 173 drivers exceeding the 80 km/h speed limit by more than 7 km/h, and 51 vehicles were identified to be unregistered for more than 30 days. The device detected a total of 15,984 vehicles during this time.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

What is claimed is:

1. An apparatus for detecting an infringement by a vehicle operator actively operating a vehicle, the apparatus comprising: one or more cameras;

one or more sensors for detecting the actively-operated vehicle and triggering the one or more camera to capture a first image of at least a part of the vehicle operator when the actively-operated vehicle reaches an image capture point; at least one flash for illuminating the vehicle or a part thereof with light at a narrow band when the actively-operated vehicle reaches the image capture point, wherein at least one of the one or more cameras comprises a narrow band filter that lets through only or substantially only the wavelengths of light produced by the at least one flash and eliminates the majority of ambient light and/or light produced by the sun, and wherein the light produced by the at least one flash is able to penetrate a windshield of the actively-operated vehicle; at least one computer processor for automatically analyzing the first image to detect an infringing act, wherein the automatic analyzing comprises: determining the location of the vehicle operator in the first image; creating a cropped image, based on the first image, showing only the vehicle operator and the vehicle operator's immediate surrounds; processing the cropped image to generate a confidence score representing a confidence that the cropped image shows an infringement; and classifying the cropped image as one of: containing an infringement, or not containing an infringement, based on the confidence score; wherein the infringement comprises at least one of:

illegal mobile device use, failure to wear a seatbelt, and incorrect restraint use;
wherein the image classification is performed substantially in real-time and the at least one computer processor is further configured to transmit an image of the infringement to a nearby police operation so that the vehicle can be intercepted and the vehicle operator issued with an on-the-spot infringement notice or fine.

2. The apparatus of claim 1, wherein the one or more cameras have a resolution of 5 to 20 megapixels.

3. The apparatus of claim 1, wherein the narrow band filter lets through light having wavelengths between one of: 700 and 1000 nm; 750 and 950 nm; 800 and 900 nm; 820 and 890 nm; 830 and 880 nm; 850 and 870 nm; or 840 and 860 nm.

4. The apparatus of claim 1, wherein the one or more filter comprises an infra-red (IR)-blocking filter.

5. The apparatus of claim 1, wherein the one or more flash comprises a tightly controlled wavelength.

6. The apparatus of claim 1, wherein the at least one flash comprises a main flash and a separate offset flash for license plates.

7. The apparatus of claim 1, wherein a high angle into the vehicle for the one or more cameras is used to capture the first image.

8. The apparatus of claim 1, wherein the one or more sensors comprise a radar.

9. The apparatus of claim 1, wherein the first image also shows a license plate of the vehicle.

10. The apparatus of claim 1, wherein the at least one flash comprises at least one capacitor to store charge between flashes.

11. The apparatus of claim 1, wherein the at least one flash is capable of firing at least 10,000 times per day.

12. The apparatus of claim 1, wherein the at least one computer processor is configured to transmit the cropped image over a computer or telecommunications network, if the enhanced cropped image is identified as containing an infringement.

13. The apparatus of claim 12, wherein a phone or mobile device location associated with the cropped image is transmitted with the cropped image.

14. The apparatus of claim 1, wherein the at least one computer processor is associated with a neural network configured to at least partially conduct the automatic analyzing.

15. The apparatus of claim 1, wherein the mobile device is a mobile device selected from a group consisting of: a mobile phone, a tablet computer, a laptop computer, a smart watch, a gaming device, and a device with a display screen.

16. A process for detecting an infringement by a vehicle operator actively operating a vehicle, the process comprising the steps of: detecting an actively-operated vehicle with one or more sensors and triggering at least one camera to capture at least one first image of at least a part of the vehicle operator when the actively-operated vehicle is at an image capture point; illuminating the detected vehicle with at least one flash with light at a narrow band when the actively-operated vehicle is at the image capture point, wherein at least one of the one or more cameras comprises a narrow band filter that lets through only or substantially only the wavelengths of light produced by the at least one flash and eliminates the majority of ambient light and/or light produced by the sun, and wherein the light produced by the at least one flash is able to penetrate a windshield of the actively-operated vehicle; automatically analyzing, using at least one processor, the first image to detect an infringing act by: determining the location of the vehicle operator in the first image; creating a cropped image, based on the first image, showing only the vehicle operator and the vehicle operator's immediate surrounds; processing the cropped image to generate a confidence score representing a confidence that the cropped image shows an infringement; and classifying the cropped image as one of: containing an infringement, or not containing an infringement, based on the confidence score; wherein the infringement comprises at least one of: illegal mobile device use, failure to wear a seatbelt, and incorrect restraint use;
wherein the image classification is performed substantially in real-time, and the process further comprises a step of transmitting an image of the infringement to a nearby police operation so that the vehicle can be intercepted and the vehicle operator issued with an on-the-spot infringement notice or fine.

17. The process of claim 16, wherein the mobile device is a mobile device selected from a group consisting of: a mobile phone, a tablet computer, a laptop computer, a smart watch, a gaming device, and a device with a display screen.

18. A non-transitory computer usable medium having stored thereon computer readable code that, when executed by at least one processor, causes the computer to execute a process for detecting an infringement by a vehicle operator actively operating a vehicle, the process comprising the steps of: detecting an actively-operated vehicle with one or more sensors and triggering at least one camera to capture at least one first image of at least a part of the vehicle operator when the actively-operated vehicle is at an image capture point; illuminating the detected vehicle with at least one flash with light at a narrow band when the actively-operated vehicle is at the image capture point, wherein at least one of the one or more cameras comprises a narrow band filter that lets through only or substantially only the wavelengths of light produced by the at least one flash and eliminates the majority of ambient light and/or light produced by the sun, and wherein the light produced by the at least one flash is able to penetrate a windshield of the actively-operated vehicle; automatically analyzing, using at least one processor, the first image to detect an infringing act by: determining the location of the vehicle operator in the first image; creating a cropped image, based on the first image, showing only the vehicle operator and the vehicle operator's immediate surrounds; processing the cropped image to generate a confidence score representing a confidence that the cropped image shows an infringement; and classifying the cropped image as one of: containing an infringement, or not containing an infringement, based on the confidence score; wherein the infringement comprises at least one of: illegal mobile device use, failure to wear a seatbelt, and incorrect restraint use;

wherein the image classification is performed substantially in real-time, and the process further comprises a step of transmitting an image of the infringement to a nearby police operation so that the vehicle can be intercepted and the vehicle operator issued with an on-the-spot infringement notice or fine.

* * * * *